United States Patent
Wang et al.

(10) Patent No.: US 12,267,135 B2
(45) Date of Patent: Apr. 1, 2025

(54) COMMUNICATION METHOD AND COMMUNICATIONS APPARATUS

(71) Applicant: HUAWEI TECHNOLOGIES CO., LTD., Guangdong (CN)

(72) Inventors: Xiaohan Wang, Shanghai (CN); Yongping Zhang, Beijing (CN); Huangping Jin, Shanghai (CN); Xiang Gao, Beijing (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 17/486,536

(22) Filed: Sep. 27, 2021

(65) Prior Publication Data

US 2022/0014251 A1    Jan. 13, 2022

Related U.S. Application Data

(63) Continuation of application No. PCT/CN2020/081188, filed on Mar. 25, 2020.

(30) Foreign Application Priority Data

Mar. 27, 2019   (CN) .......................... 201910240080.0

(51) Int. Cl.
*H04B 7/06* (2006.01)
*H04B 7/0417* (2017.01)

(52) U.S. Cl.
CPC ......... *H04B 7/0632* (2013.01); *H04B 7/0417* (2013.01); *H04B 7/0639* (2013.01)

(58) Field of Classification Search
None
See application file for complete search history.

(56) References Cited

U.S. PATENT DOCUMENTS

| 2015/0016288 A1 | 1/2015 | Maattanen et al. |
| 2018/0254867 A1 | 9/2018 | Kim et al. |

(Continued)

FOREIGN PATENT DOCUMENTS

| CA | 3056689 A1 | 9/2018 |
| CN | 102638337 A | 8/2012 |

(Continued)

OTHER PUBLICATIONS

Office Action in Chinese Appln. No. 201910240080.0, dated Mar. 1, 2023, 16 pages.

(Continued)

*Primary Examiner* — Christopher T Wyllie
(74) *Attorney, Agent, or Firm* — Fish & Richardson P.C.

(57) ABSTRACT

The present disclosure relates to communication methods and communications apparatus. One example method includes determining a plurality of frequency domain units on which reporting of a precoding matrix indicator (PMI) is based in reporting bandwidth. The plurality of frequency domain units include one or more first frequency domain units and third frequency domain units obtained by dividing one or more second frequency domain units. A granularity of the first frequency domain unit is less than a preconfigured first granularity, a granularity of the second frequency domain unit is a first granularity, and a granularity of the third frequency domain unit is a predetermined second granularity. The first granularity is a granularity preconfigured for reporting a channel quality indicator (CQI), a second granularity is a granularity predetermined for reporting the PMI, and the second granularity is less than the first granularity.

19 Claims, 14 Drawing Sheets

(56) References Cited

U.S. PATENT DOCUMENTS

| | | | | |
|---|---|---|---|---|
| 2022/0014249 A1* | 1/2022 | Hao | ................... | H04B 7/0626 |
| 2022/0022193 A1* | 1/2022 | Zhang | ............... | H04W 72/0453 |

FOREIGN PATENT DOCUMENTS

| | | | | | |
|---|---|---|---|---|---|
| CN | 103168442 | A | | 6/2013 | |
| CN | 108601084 | A | | 9/2018 | |
| CN | 109391312 | A | | 2/2019 | |
| CN | 111756420 | A | * | 10/2020 | ........... H04B 7/0417 |
| CN | 111435850 | B | * | 6/2022 | ........... H04B 7/0456 |
| EP | 3952126 | A1 | * | 2/2022 | ........... H04B 7/0417 |
| WO | 2018111809 | A1 | | 6/2018 | |

OTHER PUBLICATIONS

Extended European Search Report issued in European Application No. 20779237.5 on Jun. 28, 2022, 8 pages.

Qualcomm Incorporated, "Maintenance for CSI Acquisition," 3GPP TSG RAN WG1 Meeting #95, R1-1813395, Spokane, USA, Nov. 12-16, 2018, 4 pages.

Qualcomm Incorporated, "CSI Enhancement for MU-MIMO Support," 3GPP TSG RAN WG1 Meeting #96, R1-1903042, Athens, Greece, Feb. 25-Mar. 1, 2019, 15 pages.

ZTE, "CSI Enhancement for MU-MIMO Support," 3GPP TSG RAN WG1 Meeting #96, R1-1903343, Athens, Greece, Feb. 25-Mar. 1, 2019, 15 pages.

MediaTek Inc., "CSI enhancement for MU-MIMO," 3GPP TSG RAN WG1 #96, R1-1903223, Athens, Greece, Feb. 25-Mar. 1, 2019, 6 pages.

PCT International Search Report and Written Opinion issued in International Application No. PCT/CN2020/081188 on Jun. 10, 2020, 13 pages (partial English translation).

\* cited by examiner

CONT. FROM FIG. 7A

CONT. FROM FIG. 7A

505: Divide one or more first-type frequency domain units other than the first frequency domain unit in the reporting bandwidth into a plurality of second-type frequency domain units 507: PMI, used to indicate a precoding matrix corresponding to the first frequency domain unit and a precoding matrix corresponding to each of the plurality of second-type frequency domain units 509: Determine that the granularity of the first frequency domain unit is less than the preconfigured first granularity 510: Divide the one or more first-type frequency domain units other than the first frequency domain unit in the reporting bandwidth into the plurality of second-type frequency domain units 508: Determine, based on the PMI, the precoding matrix corresponding to the first frequency domain unit and the precoding matrix corresponding to each of the plurality of second-type frequency domain units

FIG. 7B

CONT. FROM FIG. 11A

CONT. FROM FIG. 11A

705: Determine a plurality of fourth frequency domain units based on the one or more first frequency domain units 706: Divide the one or more second frequency domain units into a plurality of third frequency domain units 708: PMI, used to indicate a precoding matrix corresponding to each of a plurality of second-type frequency domain units 710: Determine that the granularity of the first frequency domain unit is less than the preconfigured first granularity 711: Divide the first frequency domain unit into one or more third frequency domain units and one fourth frequency domain unit 712: Divide the second frequency domain unit into the plurality of third frequency domain units 709: Determine, based on the PMI, the precoding matrix corresponding to each of the plurality of second-type frequency domain units

FIG. 11B

COMMUNICATION METHOD AND COMMUNICATIONS APPARATUS

CROSS-REFERENCE TO RELATED APPLICATIONS

This application is a continuation of International Application No. PCT/CN2020/081188, filed on Mar. 25, 2020, which claims priority to Chinese Patent Application No. 201910240080.0, filed on Mar. 27, 2019. The disclosures of the aforementioned applications are hereby incorporated by reference in their entireties.

TECHNICAL FIELD

Embodiments of this application relates to the wireless field, and more specifically, to a communication method and a communications apparatus.

BACKGROUND

In some communications systems, for example, in a 5th generation (5th generation, 5G) communications system, to improve system performance, a network device usually determines, based on channel state information (CSI) fed back by a terminal device, a modulation and coding scheme (MCS), a quantity of transmission layers, a precoding matrix, and the like that are used for downlink data transmission. The MCS may be indicated, for example, by using a channel quality indicator (CQI) in the CSI. The quantity of transmission layers may be indicated, for example, by using a rank indication (RI). The precoding matrix may be indicated, for example, by using a precoding matrix indicator (PMI) in the CSI.

To obtain better data transmission performance, the network device may preconfigure a to-be-measured and to-be-reported subband by using signaling. The terminal device may perform channel measurement and feedback on each preconfigured subband. Because the PMI is key information for determining the precoding matrix by the network device, a frequency domain granularity for reporting the PMI may be redesigned to obtain a more accurate feedback from the terminal device.

SUMMARY

Embodiments of this application provide a communication method and a communications apparatus, to obtain a more accurate PMI feedback from a terminal device, thereby improving data transmission performance.

According to a first aspect, a communication method is provided. The method may be performed by a terminal device, or may be performed by a chip configured in a terminal device.

Specifically, the method includes: receiving first indication information, where the first indication information is used to configure reporting bandwidth, the reporting bandwidth includes a plurality of first-type frequency domain units on which reporting of a channel quality indicator CQI is based, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the channel quality indicator CQI; and determining a plurality of second-type frequency domain units on which reporting of a precoding matrix indicator PMI is based in the reporting bandwidth, where the plurality of second-type frequency domain units include the one or more first frequency domain units and a plurality of third frequency domain units obtained by dividing the one or more second frequency domain units, a granularity of the third frequency domain unit is a predetermined second granularity, the second granularity is a frequency domain granularity predetermined for reporting the PMI, and the second granularity is less than the first granularity.

Therefore, in the method provided in this embodiment of this application, the first frequency domain unit at an edge of the reporting bandwidth is not divided, to ensure that a pilot density is greater than or equal to a preconfigured pilot density, thereby helping obtain an accurate PMI feedback when the terminal device performs channel measurement on each second-type frequency domain unit. A network device may determine, based on the PMI feedback, a precoding matrix corresponding to each second-type frequency domain unit, to use the precoding matrix for data transmission. Therefore, this helps improve data transmission performance.

According to a second aspect, a communication method is provided. The method may be performed by a terminal device, or may be performed by a chip configured in a terminal device.

Specifically, the method includes: receiving first indication information, where the first indication information is used to configure reporting bandwidth, the reporting bandwidth includes a plurality of first-type frequency domain units on which reporting of a CQI is based, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the CQI; and determining a plurality of second-type frequency domain units on which reporting of a precoding matrix indicator PMI is based in the reporting bandwidth, where the plurality of second-type frequency domain units include a plurality of third frequency domain units obtained by dividing the one or more second frequency domain units and a plurality of fourth frequency domain units determined from the one or more first frequency domain units, at least one of the one or more first frequency domain units meets a preset condition, at least some of the plurality of fourth frequency domain units are obtained by dividing the first frequency domain unit that meets the preset condition, a granularity of the third frequency domain unit is a predetermined second granularity, a granularity of at least one of the plurality of fourth frequency domain units is less than the second granularity, the second granularity is a frequency domain granularity predetermined for reporting the PMI, and the second granularity is less than the first granularity.

Therefore, in the method provided in this embodiment of this application, the first frequency domain unit that meets the preset condition is divided into a plurality of second-type frequency domain units, to ensure, to a relatively great extent, that a pilot density is greater than or equal to a preconfigured pilot density, thereby helping obtain an accurate PMI feedback when the terminal device performs channel measurement on each second-type frequency domain unit. A network device may determine, based on the PMI feedback, a precoding matrix corresponding to each second-type frequency domain unit, to use the precoding matrix for data transmission. Therefore, this helps improve data transmission performance.

With reference to the second aspect, in some possible implementations, at least some of the plurality of fourth frequency domain units are obtained by dividing the first frequency domain unit based on the second granularity.

In other words, the terminal device may divide the at least one of the one or more first frequency domain units based on the second granularity, to obtain the plurality of fourth frequency domain units. A granularity of at least one of the plurality of fourth frequency domain units obtained through division is the second granularity.

It should be understood that the terminal device may alternatively divide the first frequency domain unit based on a ratio R of the first granularity to the second granularity, and a frequency domain granularity of a fourth frequency domain unit obtained thereby may be less than the second granularity when the granularity of the first frequency domain unit is less than the preconfigured first granularity.

Optionally, the preset condition is that a pilot density preconfigured for the first frequency domain unit is greater than or equal to 1.

The pilot density preconfigured for the first frequency domain unit is a pilot density configured for the reporting bandwidth. When the pilot density is greater than or equal to 1, regardless of how the first frequency domain unit is divided, it can always be ensured that a pilot density of the fourth frequency domain unit obtained through division is greater than or equal to the preconfigured pilot density. In addition, a frequency domain granularity on which reporting of the PMI is based can also be reduced as much as possible, to help obtain a more accurate PMI feedback from the terminal device.

According to a third aspect, a communication method is provided. The method may be performed by a terminal device, or may be performed by a chip configured in a terminal device.

Specifically, the method includes: receiving first indication information, where the first indication information is used to configure reporting bandwidth, the reporting bandwidth includes a plurality of first-type frequency domain units on which reporting of a CQI is based, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the CQI; and determining a plurality of second-type frequency domain units on which reporting of a PMI is based in the reporting bandwidth, where the plurality of second-type frequency domain units include a plurality of fourth frequency domain units determined from the one or more first frequency domain units and a plurality of third frequency domain units obtained by dividing the one or more second frequency domain units, at least some of the plurality of fourth frequency domain units are obtained by dividing at least one of the one or more first frequency domain units based on a predetermined second granularity, a granularity of the third frequency domain unit is the predetermined second granularity, the second granularity is a frequency domain granularity predetermined for reporting the PMI, and the second granularity is less than the first granularity.

Therefore, in the method provided in this embodiment of this application, the first frequency domain unit is divided into a plurality of second-type frequency domain units based on the predefined second granularity, so that both the terminal device and a network device can divide the first frequency domain unit according to a pre-agreed rule. Dividing the first frequency domain unit can reduce a frequency domain granularity for reporting the PMI, so that the terminal device can perform channel measurement on a frequency domain unit with a smaller granularity, thereby helping obtain an accurate PMI feedback. The network device may determine, based on the PMI feedback, a precoding matrix corresponding to each second-type frequency domain unit, to use the precoding matrix for data transmission. Therefore, this helps improve data transmission performance.

With reference to the third aspect, in some possible implementations, at least some of the plurality of fourth frequency domain units are obtained by dividing, based on the second granularity, a first frequency domain unit that meets a preset condition.

Dividing the first frequency domain unit that meets the preset condition can ensure, to a relatively great extent, that a pilot density is greater than or equal to a preconfigured pilot density, thereby helping obtain an accurate PMI feedback when the terminal device performs channel measurement on each second-type frequency domain unit.

Optionally, the preset condition is that a pilot density preconfigured for the first frequency domain unit is greater than or equal to 1.

The pilot density preconfigured for the first frequency domain unit is a pilot density configured for the reporting bandwidth. When the pilot density is greater than or equal to 1, regardless of how the first frequency domain unit is divided, it can always be ensured that a pilot density of the fourth frequency domain unit obtained through division is greater than or equal to the preconfigured pilot density. In addition, a frequency domain granularity on which reporting of the PMI is based can also be reduced as much as possible, to help obtain a more accurate PMI feedback from the terminal device.

According to a fourth aspect, a communication method is provided. The method may be performed by a terminal device, or may be performed by a chip configured in a terminal device.

Specifically, the method includes: receiving first indication information, where the first indication information is used to configure reporting bandwidth, the reporting bandwidth includes a plurality of first-type frequency domain units on which reporting of a CQI is based, a quantity of the first-type frequency domain units included in the reporting bandwidth is greater than or equal to a preset threshold, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the CQI; and determining a plurality of second-type frequency domain units on which reporting of a PMI is based in the reporting bandwidth, where the plurality of second-type frequency domain units include the one or more first frequency domain units and a plurality of third frequency domain units obtained by dividing the one or more second frequency domain units, a granularity of the third frequency domain unit is a predetermined second granularity, the second granularity is a frequency domain granularity predetermined for reporting the PMI, and the second granularity is less than the first granularity. Therefore, in the method provided in this embodiment of this application, the first frequency domain unit at an edge of the reporting bandwidth is not divided, to ensure that a pilot density is greater than or equal to a preconfigured pilot density, thereby helping obtain an accurate PMI feedback when the terminal device performs channel measurement on each second-type frequency domain unit. A network device may determine, based on the PMI feedback, a precoding matrix corresponding to each second-type frequency domain unit, to use the precoding matrix for data transmission. Therefore, this helps improve data transmission performance. In addition, corresponding to some codebook feedback manners, storage space can be saved.

Optionally, the preset threshold is 19.

With reference to the first aspect to the fourth aspect, in some possible implementations, the method further includes: receiving second indication information, where the second indication information is used to indicate that the ratio R of the first granularity to the second granularity is not 1.

The ratio R of the first granularity to the second granularity may be 1, or may be 2. The network device may indicate a value of R by using signaling.

Certainly, the ratio of the first granularity to the second granularity may alternatively be a predefined value. For example, R is predefined as 2 in a protocol.

It should be understood that the first indication information and the second indication information may be carried in same higher layer signaling, or may be carried in different higher layer signaling. This is not limited in this application.

According to a fifth aspect, a communication method is provided. The method may be performed by a network device, or may be performed by a chip configured in a network device.

Specifically, the method includes: determining reporting bandwidth, where the reporting bandwidth includes a plurality of first-type frequency domain units on which reporting of a channel quality indicator CQI is based, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the channel quality indicator CQI; and determining a plurality of second-type frequency domain units on which reporting of a precoding matrix indicator PMI is based in the reporting bandwidth, where the plurality of second-type frequency domain units include the one or more first frequency domain units and a plurality of third frequency domain units obtained by dividing the one or more second frequency domain units, a granularity of the third frequency domain unit is a predetermined second granularity, the second granularity is a frequency domain granularity predetermined for reporting the PMI, and the second granularity is less than the first granularity.

Therefore, in the method provided in this embodiment of this application, the first frequency domain unit at an edge of the reporting bandwidth is not divided, to ensure that a pilot density is greater than or equal to a preconfigured pilot density, thereby helping obtain an accurate PMI feedback when a terminal device performs channel measurement on each second-type frequency domain unit. The network device may determine, based on the PMI feedback, a precoding matrix corresponding to each second-type frequency domain unit, to use the precoding matrix for data transmission. Therefore, this helps improve data transmission performance.

According to a sixth aspect, a communication method is provided. The method may be performed by a network device, or may be performed by a chip configured in a network device.

Specifically, the method includes: determining reporting bandwidth, where the reporting bandwidth includes a plurality of first-type frequency domain units on which reporting of a channel quality indicator CQI is based, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the channel quality indicator CQI; and determining a plurality of second-type frequency domain units on which reporting of a precoding matrix indicator PMI is based in the reporting bandwidth, where the plurality of second-type frequency domain units include a plurality of third frequency domain units obtained by dividing the one or more second frequency domain units and a plurality of fourth frequency domain units determined from the one or more first frequency domain units, at least one of the one or more first frequency domain units meets a preset condition, at least some of the plurality of fourth frequency domain units are obtained by dividing the first frequency domain unit that meets the preset condition, a granularity of the third frequency domain unit is a predetermined second granularity, a granularity of at least one of the plurality of fourth frequency domain units is less than the second granularity, the second granularity is a frequency domain granularity predetermined for reporting the PMI, and the second granularity is less than the first granularity.

Therefore, in the method provided in this embodiment of this application, the first frequency domain unit that meets the preset condition is divided into a plurality of second-type frequency domain units, to ensure, to a relatively great extent, that a pilot density is greater than or equal to a preconfigured pilot density, thereby helping obtain an accurate PMI feedback when a terminal device performs channel measurement on each second-type frequency domain unit. The network device may determine, based on the PMI feedback, a precoding matrix corresponding to each second-type frequency domain unit, to use the precoding matrix for data transmission. Therefore, this helps improve data transmission performance.

With reference to the sixth aspect, in some possible implementations, at least some of the plurality of fourth frequency domain units are obtained by dividing the first frequency domain unit based on the second granularity.

In other words, the network device may divide the at least one of the one or more first frequency domain units based on the second granularity, to obtain the plurality of fourth frequency domain units. A granularity of at least one of the plurality of fourth frequency domain units obtained through division is the second granularity.

It should be understood that the network device may alternatively divide the first frequency domain unit based on a ratio R of the first granularity to the second granularity, and a frequency domain granularity of a fourth frequency domain unit obtained thereby may be less than the second granularity when the granularity of the first frequency domain unit is less than the preconfigured first granularity.

Optionally, the preset condition is that a pilot density preconfigured for the first frequency domain unit is greater than or equal to 1.

The pilot density preconfigured for the first frequency domain unit is a pilot density configured for the reporting bandwidth. When the pilot density is greater than or equal to 1, regardless of how the first frequency domain unit is divided, it can always be ensured that a pilot density of the fourth frequency domain unit obtained through division is greater than or equal to the preconfigured pilot density. In addition, a frequency domain granularity on which reporting of the PMI is based can also be reduced as much as possible, to help obtain a more accurate PMI feedback from the terminal device.

According to a seventh aspect, a communication method is provided. The method may be performed by a network device, or may be performed by a chip configured in a network device.

Specifically, the method includes: determining reporting bandwidth, where the reporting bandwidth includes a plurality of first-type frequency domain units on which reporting of a CQI is based, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the CQI; and determining a plurality of second-type frequency domain units on which reporting of a PMI is based in the reporting bandwidth, where the plurality of second-type frequency domain units include a plurality of fourth frequency domain units determined from the one or more first frequency domain units and a plurality of third frequency domain units obtained by dividing the one or more second frequency domain units, at least some of the plurality of fourth frequency domain units are obtained by dividing at least one of the one or more first frequency domain units based on a predetermined second granularity, a granularity of the third frequency domain unit is the predetermined second granularity, the second granularity is a frequency domain granularity predetermined for reporting the PMI, and the second granularity is less than the first granularity.

In other words, the network device may divide the at least one of the one or more first frequency domain units based on the second granularity, to obtain the plurality of fourth frequency domain units. A granularity of at least one of the plurality of fourth frequency domain units obtained through division is the second granularity.

Therefore, in the method provided in this embodiment of this application, the first frequency domain unit is divided into a plurality of second-type frequency domain units based on the predefined second granularity, so that both a terminal device and the network device can divide the first frequency domain unit according to a pre-agreed rule. Dividing the first frequency domain unit can reduce a frequency domain granularity for reporting the PMI, so that the terminal device can perform channel measurement on a frequency domain unit with a smaller granularity, thereby helping obtain an accurate PMI feedback. The network device may determine, based on the PMI feedback, a precoding matrix corresponding to each second-type frequency domain unit, to use the precoding matrix for data transmission. Therefore, this helps improve data transmission performance.

With reference to the seventh aspect, in some possible implementations, at least some of the plurality of fourth frequency domain units are obtained by dividing, based on the second granularity, a first frequency domain unit that meets a preset condition.

Dividing the first frequency domain unit that meets the preset condition can ensure, to a relatively great extent, that a pilot density is greater than or equal to a preconfigured pilot density, thereby helping obtain an accurate PMI feedback when the terminal device performs channel measurement on each second-type frequency domain unit.

Optionally, the preset condition is that a pilot density preconfigured for the first frequency domain unit is greater than or equal to 1.

The pilot density preconfigured for the first frequency domain unit is a pilot density configured for the reporting bandwidth. When the pilot density is greater than or equal to 1, regardless of how the first frequency domain unit is divided, it can always be ensured that a pilot density of the fourth frequency domain unit obtained through division is greater than or equal to the preconfigured pilot density. In addition, a frequency domain granularity on which reporting of the PMI is based can also be reduced as much as possible, to help obtain a more accurate PMI feedback from the terminal device.

According to an eighth aspect, a communication method is provided. The method may be performed by a network device, or may be performed by a chip configured in a network device.

Specifically, the method includes: determining reporting bandwidth, where the reporting bandwidth includes a plurality of first-type frequency domain units on which reporting of a CQI is based, a quantity of the first-type frequency domain units included in the reporting bandwidth is greater than or equal to a preset threshold, the plurality of first-type frequency domain units include one or more first frequency domain units and one or more second frequency domain units, a granularity of the first frequency domain unit is less than a preconfigured first granularity, a granularity of the second frequency domain unit is the first granularity, and the first granularity is a frequency domain granularity preconfigured for reporting the CQI; and determining a plurality of second-type frequency domain units on which reporting of a PMI is based in the reporting bandwidth, where the plurality of second-type frequency domain units include the one or more first frequency domain units and a plurality of third frequency domain units obtained by dividing the one or more second frequency domain units, a granularity of the third frequency domain unit is a predetermined second granularity, the second granularity is a frequency domain granularity predetermined for reporting the PMI, and the second granularity is less than the first granularity.

Therefore, in the method provided in this embodiment of this application, the first frequency domain unit at an edge of the reporting bandwidth is not divided, to ensure that a pilot density is greater than or equal to a preconfigured pilot density, thereby helping obtain an accurate PMI feedback when a terminal device performs channel measurement on each second-type frequency domain unit. The network device may determine, based on the PMI feedback, a precoding matrix corresponding to each second-type frequency domain unit, to use the precoding matrix for data transmission. Therefore, this helps improve data transmission performance. In addition, corresponding to some codebook feedback manners, storage space can be saved.

Optionally, the preset threshold is 19.

With reference to the fifth aspect to the eighth aspect, in some possible implementations, the method further includes: sending first indication information, where the first indication information is used to configure the reporting bandwidth.

The network device may configure the reporting bandwidth by sending the first indication information to the terminal device, so that the terminal device determines the reporting bandwidth based on the first indication information, and further determines the second-type frequency domain units on which reporting of the PMI is based in the reporting bandwidth.

With reference to the fifth aspect to the eighth aspect, in some possible implementations, the method further includes: sending second indication information, where the second indication information is used to indicate that a ratio R of the first granularity to the second granularity is not 1.

The ratio R of the first granularity to the second granularity may be 1, or may be 2. The network device may indicate a value of R by using signaling.

Certainly, the ratio of the first granularity to the second granularity may alternatively be a predefined value. For example, R is predefined as 2 in a protocol.

It should be understood that the first indication information and the second indication information may be carried in same higher layer signaling, or may be carried in different higher layer signaling. This is not limited in this application.

With reference to the first aspect to the eighth aspect, in some possible implementations, a quantity $N_2$ of resource blocks RBs included in the second granularity is equal to $N_1/R$, where $N_1$ represents a quantity of RBs included in the preconfigured first granularity, R is the ratio of the first granularity to the second granularity, and all of R, $N_1$, and $N_2$ are positive integers.

Therefore, the second granularity may be determined based on the first granularity. That is, $N_2=N_1/R$.

Optionally, the ratio R of the first granularity to the second granularity is 2.

In other words, the second granularity may be obtained by dividing the preconfigured first granularity by 2.

According to a ninth aspect, a communications apparatus is provided, and includes modules or units configured to perform the method in any one of the first aspect to the fourth aspect and the possible implementations of the first aspect to the fourth aspect.

According to a tenth aspect, a communications apparatus is provided, and includes a processor. The processor is coupled to a memory, and may be configured to execute an instruction in the memory, to implement the method in any one of the first aspect to the fourth aspect and the possible implementations of the first aspect to the fourth aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip configured in a terminal device. When the communications apparatus is the chip configured in the terminal device, the communications interface may be an input/output interface.

Optionally, the transceiver may be a transceiver circuit. Optionally, the input/output interface may be an input/output circuit.

According to an eleventh aspect, a communications apparatus is provided, and includes modules or units configured to perform the method in any one of the fifth aspect to the eighth aspect and the possible implementations of the fifth aspect to the eighth aspect.

According to a twelfth aspect, a communications apparatus is provided, and includes a processor. The processor is coupled to a memory, and may be configured to execute an instruction in the memory, to implement the method in any one of the fifth aspect to the eighth aspect and the possible implementations of the fifth aspect to the eighth aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip configured in a network device. When the communications apparatus is the chip configured in the network device, the communications interface may be an input/output interface.

Optionally, the transceiver may be a transceiver circuit. Optionally, the input/output interface may be an input/output circuit.

According to a thirteenth aspect, a processor is provided, and includes an input circuit, an output circuit, and a processing circuit. The processing circuit is configured to receive a signal by using the input circuit, and transmit a signal by using the output circuit, so that the processor performs the method in any one of the first aspect to the eighth aspect and the possible implementations of the first aspect to the eighth aspect.

In a specific implementation process, the processor may be one or more chips, the input circuit may be an input pin, the output circuit may be an output pin, and the processing circuit may be a transistor, a gate circuit, a flip-flop, various logic circuits, or the like. An input signal received by the input circuit may be received and input by, for example but not limited to, a receiver. A signal output by the output circuit may be, for example but not limited to, output to a transmitter and transmitted by the transmitter. The input circuit and the output circuit may be a same circuit, and the circuit is used as the input circuit and the output circuit respectively at different moments. Specific implementations of the processor and various circuits are not limited in this embodiment of this application.

According to a fourteenth aspect, a processing apparatus is provided, and includes a processor and a memory. The processor is configured to read an instruction stored in the memory, and may receive a signal by using a receiver and transmit a signal by using a transmitter, to perform the method in any one of the first aspect to the eighth aspect or the possible implementations of the first aspect to the eighth aspect.

Optionally, there are one or more processors and one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

It should be understood that a related data exchange process, for example, sending of indication information, may be a process of outputting the indication information from the processor, and receiving of capability information may be a process of receiving and inputting the capability information by the processor. Specifically, data output by the processor may be output to the transmitter, and input data received by the processor may be from the receiver. The transmitter and the receiver may be collectively referred to as a transceiver.

The processing apparatus in the fourteenth aspect may be one or more chips. The processor may be implemented by hardware, or may be implemented by software. When the processor is implemented by hardware, the processor may be a logic circuit, an integrated circuit, or the like. When the processor is implemented by software, the processor may be a general purpose processor, and is implemented by reading software code stored in the memory. The memory may be integrated into the processor, or may be located outside the processor and exist independently.

According to a fifteenth aspect, a computer program product is provided. The computer program product includes a computer program (which may also be referred to as code or an instruction). When the computer program is run, a computer is enabled to perform the method in any one of the first aspect to the eighth aspect or the possible implementations of the first aspect to the eighth aspect.

According to a sixteenth aspect, a computer readable medium is provided. The computer readable medium stores a computer program (which may also be referred to as code or an instruction). When the computer program is run on a computer, the computer is enabled to perform the method in any one of the first aspect to the eighth aspect or the possible implementations of the first aspect to the eighth aspect.

According to a seventeenth aspect, a communications system is provided, and includes the foregoing network device and terminal device.

BRIEF DESCRIPTION OF DRAWINGS

FIG. 7A and FIG. 7B are a schematic flowchart of a communication method according to another embodiment of this application;

FIG. 11A and FIG. 11B are a schematic flowchart of a communication method according to yet another embodiment of this application;

DESCRIPTION OF EMBODIMENTS

The following describes technical solutions in embodiments of this application with reference to the accompanying drawings.

The technical solutions in embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, LTE time division duplex (TDD) system, a universal mobile telecommunications system (UMTS), a worldwide interoperability for microwave access (WiMAX) communications system, a future 5th generation (5G) communications system, and a system of new radio access technology (NR).

Figure 1:
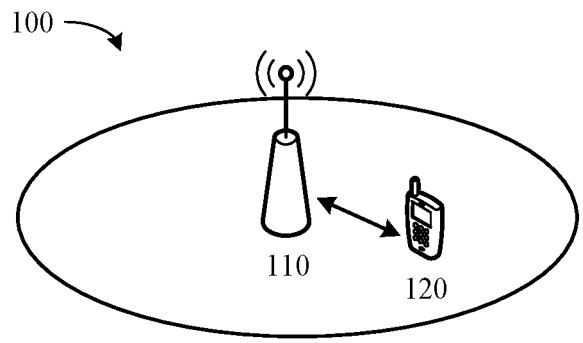
FIG. 1 is a schematic diagram of a communications system applicable to a communication method according to an embodiment of this application.

For ease of understanding the embodiments of this application, a communications system applicable to the embodiments of this application is first described in detail with reference to FIG. 1. FIG. 1 is a schematic diagram of the communications system applicable to the embodiments of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate by using a radio link. A plurality of antennas may be configured for each communications device such as the network device 110 or the terminal device 120. The plurality of antennas may include at least one transmit antenna configured to send a signal and at least one receive antenna configured to receive a signal. In addition, each communications device further includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. The network device 110 and the terminal device 120 may communicate by using a multi-antenna technology.

It should be understood that the network device in the wireless communications system may be any device that has a wireless transceiver function. The device includes but is not limited to: an evolved NodeB (eNB), a radio network controller (RNC), a NodeB (NB), a base station controller (BSC), a base transceiver station (BTS), a home base station (for example, Home evolved NodeB, or Home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, the device may be a gNB or a transmission point (TRP or TP) in a 5G system, for example, an NR system, or one antenna panel or a group (including a plurality of antenna panels) of antenna panels of a base station in a 5G system; or may be a network node, for example, a baseband unit (BBU) or a distributed unit (DU), that constitutes a gNB or a transmission point.

In some deployments, the gNB may include a centralized unit (CU) and a DU. The gNB may further include a radio unit (RU). The CU implements some of functions of the gNB, and the DU implements some of the functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. RRC layer information finally becomes PHY layer information, or is converted from PHY layer information. Therefore, in such an architecture, higher layer signaling, for example, RRC layer signaling, may also be considered as being sent by the DU or sent by the DU and the CU. It may be understood that the network device may be a CU node, a DU node, or a device including a CU node and a DU node. In addition, the CU may be classified as a network device in a radio access network (RAN), or the CU may be classified as a network device in a core network (CN). This is not limited in this application.

It should be further understood that the terminal device in the wireless communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in this embodiment of this application may be a mobile phone, a tablet computer (pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in this embodiment of this application.

For ease of understanding the embodiments of this application, first, terms used in this application are briefly described.

1. Precoding matrix indicator (PMI): The PMI may be used to indicate a precoding matrix. The precoding matrix may be, for example, a precoding matrix that is determined by a terminal device based on a channel matrix of each frequency domain unit (for example, subband) and that corresponds to the frequency domain unit.

The channel matrix may be determined by the terminal device in a manner such as channel estimation or based on channel reciprocity. However, it should be understood that a specific method for determining the channel matrix by the terminal device is not limited to the foregoing description. For a specific implementation, refer to the current technology. For brevity, details are not listed herein.

The precoding matrix may be obtained by performing singular value decomposition (SVD) on the channel matrix or a covariance matrix of the channel matrix, or may be obtained by performing eigenvalue decomposition (EVD) on a covariance matrix of the channel matrix.

It should be understood that the foregoing listed manners of determining the precoding matrix are merely examples, and shall not constitute any limitation on this application. For a manner of determining the precoding matrix, refer to the current technology. For brevity, details are not listed herein.

It should be noted that, in the embodiments of this application, a precoding matrix corresponding to a frequency domain unit may be a precoding matrix fed back for the frequency domain unit, for example, may be a precoding matrix for channel measurement and feedback based on a reference signal on the frequency domain unit. The precoding matrix corresponding to the frequency domain unit may be a precoding matrix used to precode data that is subsequently transmitted by using the frequency domain unit. In the following, a precoding matrix corresponding to a frequency domain unit may also be referred to as a precoding matrix of the frequency domain unit, and a precoding vector corresponding to a frequency domain unit may also be referred to as a precoding vector of the frequency domain unit.

It should be further noted that, in the embodiments of this application, a precoding matrix determined by a network device based on a feedback of a terminal device may be directly used for downlink data transmission. A precoding matrix finally used for downlink data transmission may be alternatively obtained by using some beamforming methods, for example, including zero forcing (ZF), regularized zero-forcing (RZF), a minimum mean square error (MMSE), and a maximum signal to leakage plus noise ratio (SLNR). This is not limited in this application. Unless otherwise specified, any precoding matrix (or vector) mentioned below may be a precoding matrix (or vector) determined by the network device based on a feedback of the terminal device.

2. Channel quality indicator (CQI): The CQI may be used to indicate channel quality. The CQI may be represented, for example, by using a signal-to-noise ratio (SNR) or a signal to interference plus noise ratio (SINR). The CQI can be used to determine a modulation and coding scheme (MCS). During downlink transmission, the network device may determine, based on a CQI fed back by the terminal device, an MCS corresponding to channel quality, to perform coding and modulation processing on a to-be-sent signal. For example, the network device may determine, based on a predefined correspondence between a CQI and an MCS, an MCS corresponding to a CQI that is currently fed back.

It should be understood that the foregoing listed SNR and SINR used to represent the CQI and the mentioned correspondence between a CQI and an MCS are merely examples, and shall not constitute any limitation on this application. Specific content and an indication manner of the CQI are not limited in this application. A relationship between a CQI and an MCS is not limited in this application, either.

3. Reporting bandwidth: In the embodiments of this application, the reporting bandwidth may be bandwidth that is configured by the network device in higher layer signaling (for example, a radio resource control (RRC) message) by using a reporting bandwidth (csi-ReportingBand) field length in an information element (IE) CSI reporting configuration (CSI-ReportConfig). The information element csi-ReportingBand may be used to indicate a group of contiguous or non-contiguous subbands that are in a BWP and for which CSI needs to be reported. The information element csi-ReportingBand may be, for example, a bitmap. Each bit may correspond to one subband in the reporting bandwidth. Therefore, a length of the bitmap may represent a quantity of subbands included in the reporting bandwidth. Each bit in the bitmap may be used to indicate whether CSI needs to be reported for a corresponding subband. For example, when an indication bit is set to "1", CSI needs to be reported for a corresponding subband; when an indication bit is set to "0", CSI does not need to be reported for a corresponding subband. It should be understood that meanings expressed by indication bit values listed herein are merely examples, and shall not constitute any limitation on this application.

In a possible design, the reporting bandwidth may be a BWP. To be specific, a length of the bitmap used to indicate the reporting bandwidth may be the same as a quantity of subbands included in the BWP.

The subband may be a subband on which reporting of a CQI is based, or a frequency domain unit on which reporting of a CQI is based. The terminal device may receive a reference signal on the reporting bandwidth, to perform channel measurement and CQI reporting.

It should be understood that the signaling used to configure the reporting bandwidth and the signaling used to indicate the to-be-reported subband that are listed above are merely examples, and shall not constitute any limitation on this application. Signaling used to indicate the reporting bandwidth, signaling used to indicate a to-be-reported subband, and a specific indication manner are not limited in this application.

In addition, the reporting bandwidth may be contiguous, or may be non-contiguous. This is not limited in this application.

Because a subband on which reporting of a PMI is based is described in the following, for ease of distinguishment, it is noted herein that the subband configured in the reporting bandwidth is the subband on which reporting of the CQI is based, that is, a first-type frequency domain unit described below. A granularity of the first-type frequency domain unit may be a preconfigured first granularity.

4. Pilot density: The pilot density is a ratio of a quantity of resource elements (RE) occupied by a reference signal of a same port to a total quantity of RBs in bandwidth occupied by the reference signal of the same port. For example, if a pilot density of a reference signal of a port is 1, it may indicate that one RE in each RB in bandwidth occupied by the reference signal of the port is used to carry a reference signal of the port. For another example, if a pilot density of a reference signal of a port is 0.5, it may indicate that one RB in every two RBs in bandwidth occupied by the reference signal of the port includes an RE that carries a reference signal of the port, in other words, there is one RB between adjacent RBs used to carry reference signals of the port.

In a current protocol, a pilot density may be 3, 1, or 0.5.

Figure 2:
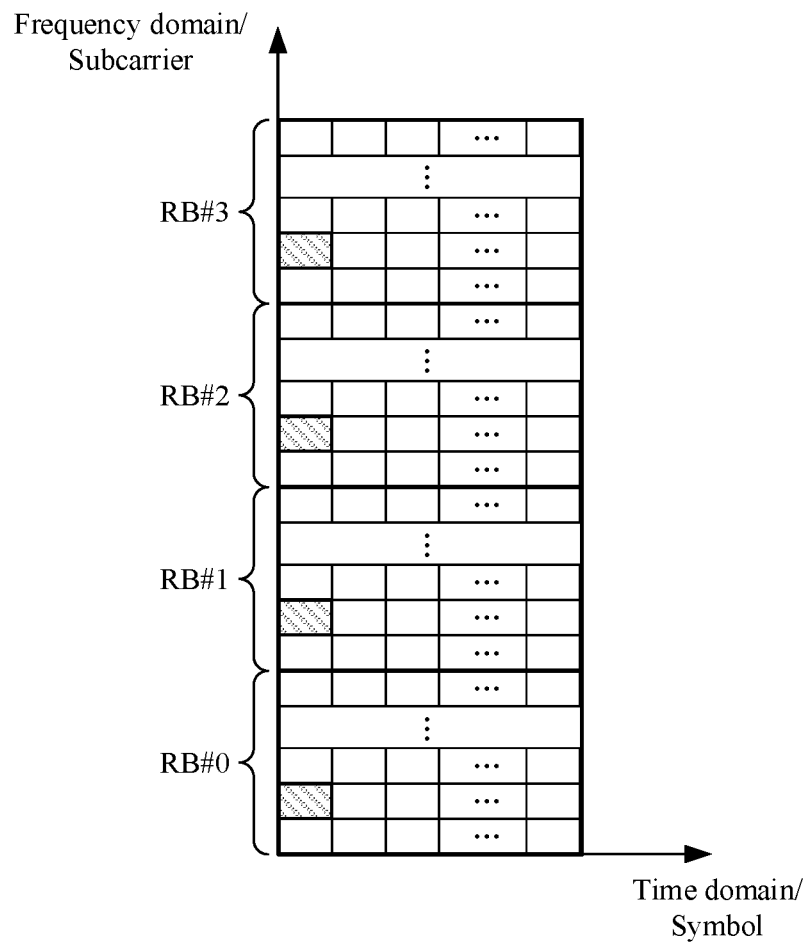
FIG. 2 is a schematic diagram of a case in which a pilot density is 1 according to an embodiment of this application.
Figure 3:
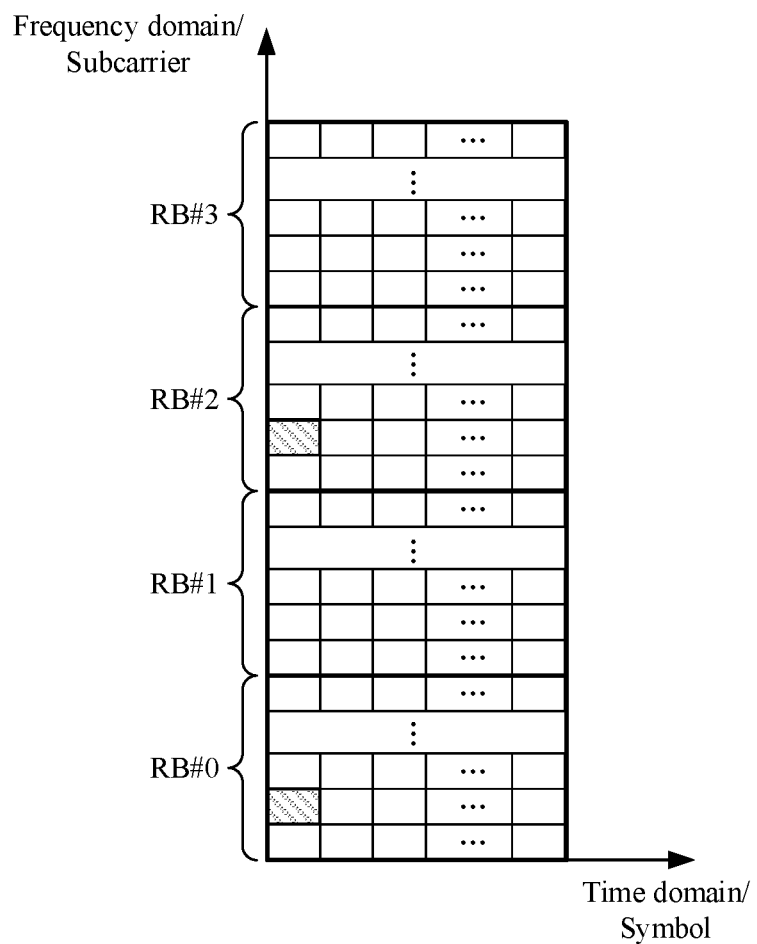
FIG. 3 is a schematic diagram of a case in which a pilot density is 0.5 according to an embodiment of this application.

For ease of understanding, FIG. 2 and FIG. 3 show two examples in which pilot densities are 1 and 0.5, respectively. It should be understood that, for ease of understanding, the accompanying drawings show only a case in which reference signals of one port are distributed on four RBs. However, this shall not constitute any limitation on this application. A quantity of RBs included in bandwidth occupied by a reference signal of one port is not limited in this application. A quantity of REs occupied by a reference signal of one port in one RB is not limited in this application, either. A quantity of ports of a reference signal that can be carried in each RB is not limited in this application, either.

FIG. 2 shows an example in which a pilot density is 1. As shown in the figure, one RE in each RB is used to carry a reference signal of a same port. In the figure, an RE of the zeroth symbol of the first subcarrier in each RB carries a reference signal. Therefore, when the pilot density is 1, each RB in bandwidth occupied by a reference signal of the port carries one reference signal.

FIG. 3 shows an example in which a pilot density is 0.5. As shown in the figure, one RE in every two RBs is used to carry a reference signal of a same port. In the figure, an RE of the zeroth symbol of the first subcarrier in each of an RB #0 and an RB #2 carries a reference signal, and no REs in an RB #1 and an RB #3 carry a reference signal. Therefore, when the pilot density is 0.5, there is one RB between adjacent RBs used to carry reference signals of the same port. In other words, one RB in every two RBs carries a reference signal.

It should be understood that, although not shown in the figure, a person skilled in the art may understand that the two REs used to carry the reference signals may alternatively be REs of the zeroth symbols of the first subcarriers in the RB #1 and the RB #3, and REs in the RB #0 and the RB #2 may not carry a reference signal.

It should be further understood that the pilot densities listed above are merely examples, and shall not constitute any limitation on this application. A specific value of a pilot density is not limited in this application.

5. Frequency domain unit: The frequency domain unit is a unit of a frequency domain resource, and may represent different frequency domain resource granularities. For example, the frequency domain unit may include but is not limited to a subband, a resource block (RB), a resource block group (RBG), or a precoding resource block group (PRBG).

In the embodiments of this application, different types of frequency domain units may be defined based on different functions. Specifically, a frequency domain unit on which reporting of a CQI is based, or a frequency domain unit corresponding to CQI reporting, may be referred to as a first-type frequency domain unit. A frequency domain unit on which reporting of a PMI is based, or a frequency domain unit corresponding to PMI reporting, may be referred to as a second-type frequency domain unit. In the embodiments of this application, the first-type frequency domain unit may be replaced with a CQI subband, and the second-type frequency domain unit may be replaced with a PMI subband.

Herein, the frequency domain unit corresponding to CQI reporting may specifically mean that the CQI is reported based on the frequency domain unit, and the network device may determine, based on CQIs reported based on a plurality of frequency domain units, an MCS used for signal transmission.

The frequency domain unit corresponding to PMI reporting may specifically mean that the PMI is reported based on the frequency domain unit, and the network device may determine, based on the PMI, a precoding matrix used to transmit data on the frequency domain unit.

The first-type frequency domain unit and the second-type frequency domain unit may have a same granularity, or may have different granularities.

A granularity of the first-type frequency domain unit on which reporting of the CQI is based may be preconfigured. A granularity of the second-type frequency domain unit on which reporting of the PMI is based may also be predetermined. In the following, for ease of distinguishment and description, a frequency domain unit granularity preconfigured for reporting a CQI is denoted as the first granularity, and a frequency domain unit granularity predetermined for reporting a PMI is denoted as a second granularity.

Optionally, the first granularity is greater than the second granularity. In the embodiments of this application, different granularities may be distinguished by using quantities of included RBs. For example, that the first granularity is less than the second granularity may specifically mean that a quantity of RBs included in the first granularity is less than a quantity of RBs included in the second granularity.

The network device may indicate the first granularity to the terminal device by using signaling, or configure the first granularity by using signaling. For example, the first granularity may be configured by using higher layer signaling CSI reporting configuration (CSI-ReportConfig). The first granularity may be specifically indicated by a subband granularity (subband size) field in the CSI reporting configuration. In other words, the first granularity may be a preconfigured subband granularity.

The network device may further indicate a ratio R of the first granularity to the second granularity to the terminal device by using signaling. The ratio R may also be indicated, for example, by using higher layer signaling. The second granularity may be determined based on the first granularity and the ratio R of the first granularity to the second granularity. For example, if the quantity of RBs included in the first granularity is denoted as $N_1$, and the quantity of RBs included in the second granularity is denoted as $N_2$, $N_2=N_1/R$. When R is 1, the first granularity and the second granularity are the same. When R is greater than 1, the first granularity is greater than the second granularity.

In a possible design, R=2. That is, the ratio of the first granularity to the second granularity is 2. In other words, the quantity of RBs included in the first granularity is twice the quantity of RBs included in the second granularity.

It should be noted that, because the first granularity is preconfigured, the second granularity is predetermined. However, in reporting bandwidth actually configured for the terminal device, it cannot be ensured that granularities of all first-type frequency domain units are equal to the first granularity, and therefore, it cannot be ensured that granularities of all second-type frequency domain units are equal to the second granularity.

This is mainly because a start location of a bandwidth part (BWP) is different from a reference point of a subband. Specifically, in NR, each carrier is divided into RBs in a unit of 12 contiguous subcarriers in frequency domain, and a "point A" is used as a common reference point for the division into RBs. Specifically, a common resource block (CRB) number may start from 0, for example, a common resource block with the number 0 is denoted as CRB0. A midpoint of a subcarrier 0 in the CRB0 in frequency domain may correspond to the point A, and the point A may be configured by the network device for the terminal device. The CRB0 may be used as a reference point for division into subbands.

In addition, a maximum of four BWPs may be configured on one carrier. Each BWP may include a plurality of contiguous physical resource blocks (PRB), and PRBs in each BWP may be numbered from 0. The BWP is divided into subbands, each subband includes a group of contiguous PRBs, and the CRB0 is used as a reference point for the division into subbands. Therefore, sizes of the first subband and the last subband that are in the BWP are not necessarily equal to a preconfigured subband granularity.

It should be understood that the PRB and the RB may represent a same meaning when being used to indicate physical resources.

Figure 4:
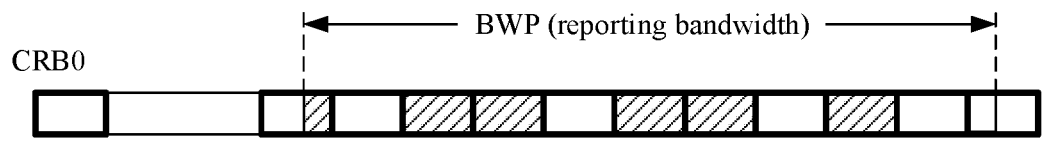
FIG. 4 is a schematic diagram of a BWP, subbands, and reporting bandwidth according to an embodiment of this application.

For ease of understanding, FIG. 4 shows an example of a BWP, subbands, and reporting bandwidth. As shown in the figure, a reference point for division into subbands is a CRB0 in the figure. A start location of the BWP is determined based on signaling configured by a network device for a terminal device. The start location of the BWP may be aligned with a start point of an RB, or may not be aligned with a start point of any RB. An end location of the BWP may be aligned with an end point of an RB, or may not be aligned with an end point of any RB. The figure shows an example in which the start location of the BWP is not aligned with a start point of any RB and the end location of the BWP is not aligned with an end point of any RB.

In addition, the reporting bandwidth may be the same as the BWP configured by the network device for the terminal device. Therefore, a start location of the reporting bandwidth overlaps the start location of the BWP, and an end location of the reporting bandwidth also overlaps the end location of the BWP. In this case, the first subband in the reporting bandwidth is an incomplete subband, and the last subband in the reporting bandwidth is also an incomplete subband. In other words, a granularity of the first subband in the reporting bandwidth is not a preconfigured subband granularity, and a granularity of the last subband in the reporting bandwidth is not the preconfigured subband granularity, either.

It should be understood that the figure is merely an example, and shows the example in which the BWP is used as the reporting bandwidth. However, this shall not constitute any limitation on this application, and a size relationship between the BWP and the reporting bandwidth is not limited in this application. For example, the BWP may alternatively include one or more pieces of reporting bandwidth. When a boundary of the reporting bandwidth overlaps a boundary of the BWP, it is possible that the first or the last subband in the reporting bandwidth is an incomplete subband. Herein, the boundary may include a start location and an end location.

It should be further understood that the foregoing preconfigured subband granularity may be a subband granularity configured for CQI reporting, that is, may be an example of the preconfigured first granularity in the embodiments of this application. The foregoing subband may be a subband configured for CQI reporting, that is, may be an example of the first-type frequency domain unit in the embodiments of this application. It can be learned from the foregoing descriptions that the granularity of the first-type frequency domain unit is not necessarily the preconfigured first granularity.

As described above, the second granularity may be determined based on the first granularity and the ratio R of the first granularity to the second granularity. To obtain a more accurate PMI feedback from the terminal device, R may be designed to be a value greater than 1, for example, R is 2.

In addition, the network device may map, based on a preconfigured pilot signal, a reference signal to a corresponding RB for transmission, so that the terminal device performs channel measurement based on the reference signal received on the reporting bandwidth. A preconfigured pilot density may be 1, or may be less than 1, for example, 0.5. When the pilot density is 0.5, one RB in every two RBs carries a reference signal. However, if the first or the last subband in the reporting bandwidth is an incomplete subband, after the subband is divided based on the second granularity, it is possible that a pilot density in the divided subband is less than the preconfigured pilot density.

For example, the first subband (that is, an example of the first-type frequency domain unit, denoted as a CQI subband for ease of distinguishment) in the reporting bandwidth includes two RBs, and the pilot density is 0.5. In this case, one of the two RBs carries a reference signal, and the other RB does not carry a reference signal. However, if R is 2, after the subband is further divided into two subbands with smaller granularities (that is, an example of the second-type frequency domain unit, denoted as PMI subbands for ease of description), each PMI subband includes only one RB. In this case, there is necessarily one PMI subband that does not carry a reference signal, that is, a pilot density in the PMI subband is 0, which is less than the preconfigured pilot density 0.5. The terminal device does not receive a reference signal in the PMI subband, and cannot perform channel measurement based on the PMI subband. Even if the pilot density of the PMI subband is not 0, if the pilot density is less than the preconfigured pilot density 0.5, a result obtained by the terminal device by performing channel measurement on the PMI subband is inaccurate. Therefore, an accurate feedback for the PMI subband cannot be obtained.

In view of this, the embodiments of this application provide a communication method, to avoid a case in which a pilot density in a PMI subband is less than a preconfigured pilot density, to obtain a more accurate PMI feedback, thereby improving data transmission performance.

For ease of understanding the embodiments of this application, the following descriptions are provided.

First, in the embodiments of this application, reporting bandwidth may be used to configure a to-be-reported CQI subband. However, this does not mean that a CQI needs to be reported for each CQI subband in the reporting bandwidth. As described above, a network device may indicate, by using a bitmap, whether a CQI needs to be reported for each CQI subband in the reporting bandwidth. A terminal device may determine, based on the bitmap, a location and a quantity of subbands for which a CQI needs to be reported. Because a boundary of the reporting bandwidth may not be aligned with a boundary of the CQI subband, it cannot be ensured that each CQI subband in the reporting bandwidth meets a preconfigured pilot density. For example, when a CQI subband at an edge of the reporting bandwidth includes an odd number of RBs, and the pilot density is 0.5, a pilot density in the CQI subband may be greater than 0.5, or may be less than 0.5. If the pilot density is less than 0.5, the network device does not configure the CQI subband as a to-be-reported subband in the bitmap corresponding to the reporting bandwidth. For example, an indication bit that corresponds to the CQI subband and that is in the bitmap is always "0". However, if the pilot density is greater than 0.5, the CQI subband may be configured as a subband for which a CQI is to be reported.

For ease of understanding and description, in the following descriptions of the embodiments, it is assumed that a pilot density of a first frequency domain unit at an edge of reporting bandwidth is greater than or equal to a preconfigured pilot density. In other words, the first frequency domain unit at the edge of the reporting bandwidth may be configured as a subband for which a CQI is to be reported.

Second, in the embodiments of this application, for ease of description, in regard to numbering, consecutive numbers may start from 0, for example, RB #0 and CRB0. Examples are not described one by one herein. Certainly, specific implementation is not limited thereto. For example, consecutive numbers may alternatively start from 1. It should be understood that the foregoing descriptions are settings for ease of describing the technical solutions provided in the embodiments of this application, but are not intended to limit the scope of this application.

Third, in the embodiments of this application, an "indication" may include a direct indication and an indirect indication, or may include an explicit indication and an implicit indication. Information indicated by a piece of information (for example, configuration information described below) is referred to as to-be-indicated information. In a specific implementation process, the to-be-indicated information may be indicated in a plurality of manners, for example but not limited to, directly indicating the to-be-indicated information, for example, indicating the to-be-indicated information itself or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and another part of the to-be-indicated information is known or pre-agreed. For example, specific information may be indicated by using a pre-agreed (for example, protocol-stipulated) arrangement sequence of information, to reduce indication overheads to some extent.

Fourth, in the following embodiments, all terms and abbreviations, such as downlink control information (DCI), radio resource control (RRC), pilot density, subband, CQI, PMI, and RI, are examples provided for ease of description, and shall not constitute any limitation on this application. This application does not exclude a possibility of defining another term that can implement a same or similar function in an existing protocol or a future protocol.

Fifth, "first", "second", and various numbers in the following embodiments are merely used for distinguishment for ease of description, and are not intended to limit the scope of the embodiments of this application. For example, "first", "second", and the numbers are used to distinguish between different indication information and between different frequency domain units.

Sixth, in the following embodiments, "preconfigure" may mean that the network device indicates to the terminal device in advance by using signaling, so that the terminal device determines corresponding content based on the signaling, and may prestore the content. For example, that the network device preconfigures the first granularity for the terminal device may mean that the network device indicates the first granularity to the terminal device in advance by using signaling, so that the terminal device determines the first granularity based on the signaling, and may prestore a value of the first granularity.

"Predefinition" may mean defining in advance, for example, predefinition in a protocol. "Predefinition" may be implemented by prestoring corresponding code or a corresponding table in a device (for example, including the terminal device and/or the network device), or in another manner that can be used to indicate related information. A specific implementation of "predefinition" is not limited in this application.

The "storing" herein may mean storing in one or more memories of the device (for example, the terminal device and/or the network device). The one or more memories may be separately disposed, or may be integrated into an encoder, a decoder, a processor, or a communications apparatus. Alternatively, the following disposition manner may be used: Some of the one or more memories are separately disposed, and some of the one or more memories are integrated into a decoder, a processor, or a communications apparatus. A type of the memory may be a storage medium in any form. This is not limited in this application.

Seventh, a "protocol" in the embodiments of this application may be a standard protocol in the communications field, for example, may include an LTE protocol, an NR protocol, and a related protocol applied to a future communications system. This is not limited in this application.

Eighth, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where each of A and B may be singular or plural. The character "/" generally indicates an "or" relationship between associated objects. "At least one of the following (items)" or a similar expression thereof means any combination of these items, including a single item or any combination of a plurality of items. For example, at least one of a, b, and c may represent: a; b; c; a and b; a and c; b and c; or a, b, and c, where each of a, b, and c may be singular or may be plural.

Ninth, in the embodiments of this application, for ease of distinguishment and description, a frequency domain unit on which reporting of a CQI is based is denoted as a first-type frequency domain unit, and a frequency domain unit on which reporting of a PMI is based is denoted as a second-type frequency domain unit. First-type frequency domain units may include one or more first frequency domain units and one or more second frequency domain units. The first frequency domain unit is a frequency domain unit at the edge of the reporting bandwidth, and the second frequency domain unit is a frequency domain unit other than the first frequency domain unit in the reporting bandwidth. Therefore, a granularity of the first frequency domain unit may be less than the preconfigured first granularity, or may be equal to the preconfigured first granularity, and a granularity of the second frequency domain unit is equal to the preconfigured first granularity. A plurality of third frequency domain units may be obtained by dividing each second frequency domain unit, and a granularity of the third frequency domain unit is the predetermined second granularity. One or more fourth frequency domain units may be determined from one first frequency domain unit. For example, the first frequency domain unit is directly determined as the fourth frequency domain unit, or the first frequency domain unit is divided into a plurality of fourth frequency domain units. A granularity of the fourth frequency domain unit may be less than the second granularity, may be equal to the second granularity, or may be greater than the second granularity. This is not limited in this application. It may be understood that both the first frequency domain unit and the second frequency domain unit are first-type frequency domain units, and both the third frequency domain unit and the fourth frequency domain unit are second-type frequency domain units.

The following describes in detail communication methods and communications apparatuses provided in the embodiments of this application with reference to the accompanying drawings.

It should be understood that the technical solutions in the embodiments of this application may be applied to a wireless communications system, for example, the communications system 100 shown in FIG. 1. There may be a wireless communications connection relationship between two communications apparatuses in the wireless communications system. One of the two communications apparatuses may correspond to the terminal device 120 shown in FIG. 1, for example, may be the terminal device shown in FIG. 1, or may be a chip configured in the terminal device. The other of the two communications apparatuses may correspond to the network device 110 shown in FIG. 1, for example, may be the network device shown in FIG. 1, or may be a chip configured in the network device.

Without loss of generality, the following uses a process of interaction between a terminal device and a network device as an example to describe in detail the communication method provided in the embodiments of this application. For ease of understanding, the following uses downlink transmission as an example to describe the method provided in the embodiments of this application.

Figure 5:
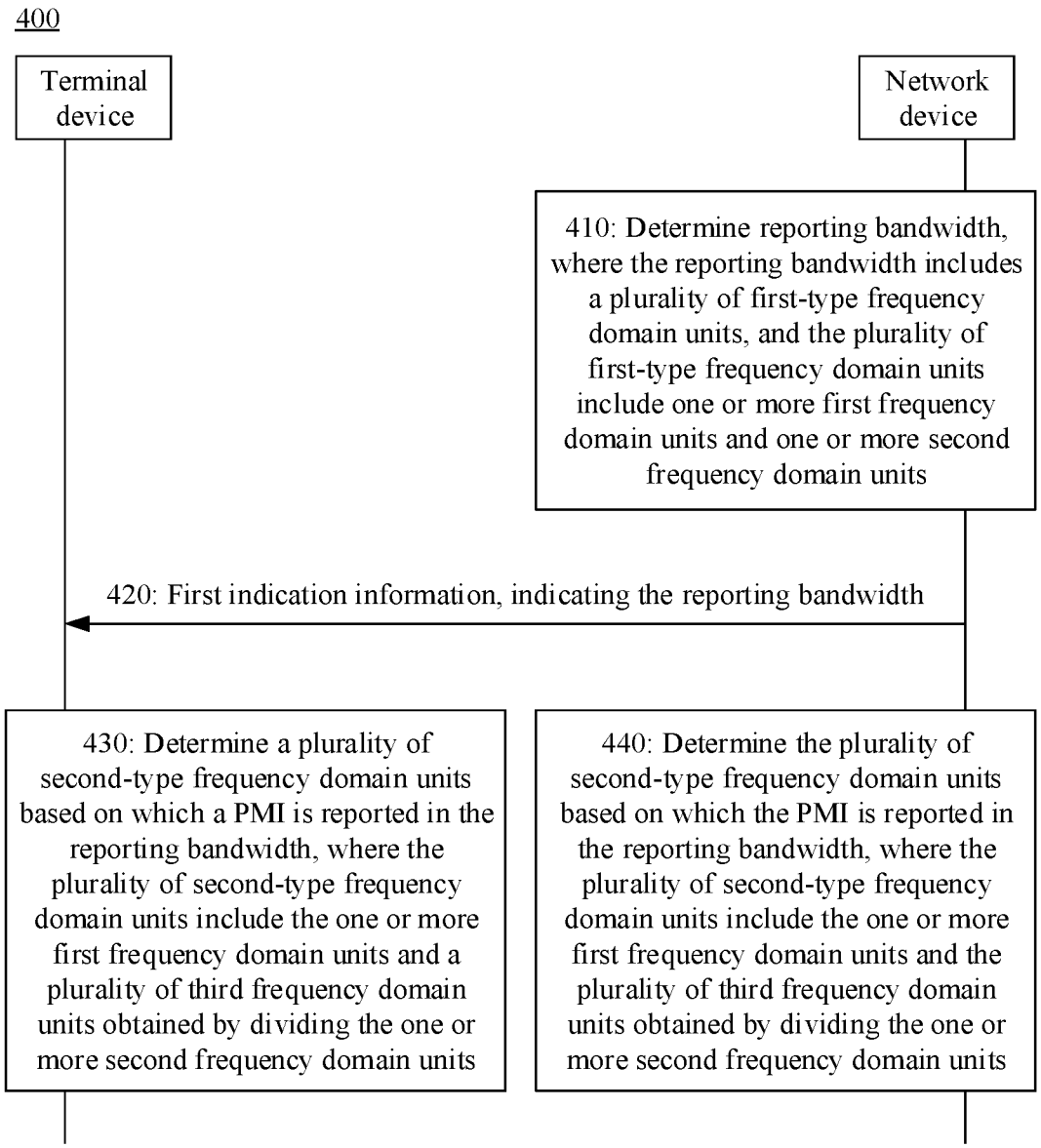
FIG. 5 is a schematic flowchart of a communication method according to an embodiment of this application.

FIG. 5 is a schematic flowchart of a communication method 400 according to an embodiment of this application from a perspective of interaction between devices. As shown in the figure, the method 400 shown in FIG. 5 may include operation 410 to operation 440. The following describes the method 400 in detail with reference to the accompanying drawings.

In operation 410, a network device determines reporting bandwidth, where the reporting bandwidth includes a plurality of first-type frequency domain units on which reporting of a CQI is based.

Specifically, the plurality of first-type frequency domain units include one or more first frequency domain units and one or more second frequency domain units. The first frequency domain unit may be, for example, the first or the last frequency domain unit in the reporting bandwidth. In other words, the first frequency domain unit may be a frequency domain unit at an edge of the reporting bandwidth.

In this embodiment of this application, a granularity of the first frequency domain unit is less than a preconfigured first granularity. Referring to FIG. 4, both the first and the last CQI subbands in the reporting bandwidth shown in FIG. 4 are incomplete first-type frequency domain units. In other words, granularities of the first and the last CQI subbands in the reporting bandwidth are both less than the preconfigured first granularity.

It may be understood that the reporting bandwidth may include one incomplete first-type frequency domain unit, may include two incomplete first-type frequency domain units, or may not include any incomplete first-type frequency domain unit. The method provided in the embodiments of this application is mainly a technical solution proposed for a case in which the reporting bandwidth includes an incomplete first-type frequency domain unit. A case in which the reporting bandwidth does not include any incomplete first-type frequency domain unit is not described in detail herein. In other words, the foregoing first frequency domain unit may be one incomplete first-type frequency domain unit, or may be two incomplete first-type frequency domain units. A granularity of the second frequency domain unit may be the preconfigured first granularity. The second frequency domain unit may be, for example, a frequency domain unit other than the first and the last frequency domain units in the reporting bandwidth. All second frequency domain units belong to the first-type frequency domain units.

In operation 420, the network device sends first indication information, where the first indication information is used to indicate the reporting bandwidth. Correspondingly, in operation 420, a terminal device receives the first indication information.

The terminal device may determine the reporting bandwidth based on the first indication information sent by the network device. The first indication information may be, for example, the CSI reporting configuration described above. The CSI reporting configuration may carry an IE csi-ReportingBand, to indicate a frequency domain unit for which a CQI is to be reported. Because a specific indication manner of the reporting bandwidth is described above in detail, for brevity, details are not described herein again.

In operation 430, the terminal device determines a plurality of second-type frequency domain units on which reporting of a PMI is based in the reporting bandwidth. The plurality of second-type frequency domain units include the one or more first frequency domain units and a plurality of third frequency domain units obtained by dividing the one or more second frequency domain units.

Specifically, the terminal device may determine the reporting bandwidth based on the first indication information, and further determine the plurality of second-type frequency domain units on which reporting of the PMI is based in the reporting bandwidth. In this embodiment, the terminal device may not divide the first frequency domain unit, and directly uses the first frequency domain unit as a second-type frequency domain unit. In other words, the terminal device may divide only the second frequency domain unit, to obtain the plurality of second-type frequency domain units including the plurality of third frequency domain units and the one or more first frequency domain units.

When the first frequency domain unit is selected as the frequency domain unit for which the CQI is to be reported, it is already determined that a pilot density of the first frequency domain unit is greater than or equal to a preconfigured pilot density. When a frequency domain unit for PMI reporting is determined, because the first frequency domain unit is not divided, a pilot density of the second-type frequency domain unit for PMI reporting is also greater than or equal to the preconfigured pilot density.

Optionally, the method further includes: The terminal device divides the one or more second frequency domain units into the plurality of third frequency domain units.

The terminal device may divide each second frequency domain unit into a plurality of third frequency domain units. The one or more second frequency domain units may be divided into the plurality of third frequency domain units. Optionally, the terminal device divides the one or more second frequency domain units into the plurality of third frequency domain units based on a predetermined second granularity, to ensure that a granularity of each third frequency domain unit obtained through division is the second granularity.

Therefore, the terminal device may determine the second granularity before dividing the second frequency domain unit.

As described above, each of the second granularity and the first granularity may be represented by using a quantity of included RBs. Optionally, a quantity $N_2$ of RBs included in the second granularity is equal to $N_1/R$, $N_1$ represents a quantity of RBs included in the preconfigured first granularity, R is a ratio of the first granularity to the second granularity, and all of R, $N_1$, and $N_2$ are positive integers. Therefore, the terminal device may determine the second granularity based on the preconfigured first granularity and the ratio R of the first granularity to the second granularity.

For example, the quantity of RBs included in the second granularity is denoted as, for example, $N_2$; the quantity of RBs included in the first granularity is denoted as, for example, $N_1$; and $N_1$ may be determined based on the preconfigured first granularity. In this case, $N_2=N_1/R$. For example, if $N_1=8$ and $R=2$, $N_2=4$.

The first granularity may be, for example, configured by the network device by using signaling. For example, a subband granularity (subband size) field in the CSI reporting configuration indicates the first granularity.

In addition, the ratio R of the first granularity to the second granularity may be predefined in a protocol, or may be configured by the network device by using signaling.

Optionally, the method further includes: The terminal device receives second indication information, where the second indication information is used to indicate the ratio R of the first granularity to the second granularity. Correspondingly, the network device sends the second indication information.

In an implementation, the second indication information may directly indicate a value of R. For example, when the second indication information indicates that R is 2, the terminal device may determine that R is not 1. Therefore, the second indication information implicitly indicates that the ratio R of the first granularity to the second granularity is not 1.

In another implementation, alternatively, the second indication information may directly indicate, by using an indication bit, whether a value of R is 2. For example, when the indication bit is "1", it indicates that R is 2; when the indication bit is "0", it indicates that R is 1. In this case, the terminal device may determine, based on the indication bit, whether the value of R is 1. This actually implicitly indicates the specific value of R.

Optionally, the ratio R of the first granularity to the second granularity is 2.

In a possible design, the second indication information and the first indication information may be carried by using same signaling. The signaling may be, for example, higher layer signaling, such as an RRC message.

It should be understood that a method for indicating whether the value of R is 1 and the specific value of R is not limited in this application. For example, R may alternatively have more optional values.

After determining the second granularity, the terminal device may divide each second frequency domain unit. Each second frequency domain unit is a complete first-type frequency domain unit, and a granularity of each second frequency domain unit is the preconfigured first granularity. Therefore, a value determined by a ratio of the first granularity to R is the second granularity. Therefore, that the terminal device divides the one or more second frequency domain units into the plurality of third frequency domain units based on the predetermined second granularity may be replaced with the following: The terminal device divides the one or more second frequency domain units into the plurality of third frequency domain units based on the ratio R of the preconfigured first granularity to the second granularity.

In a current protocol, a quantity of RBs included in a CQI reporting granularity (namely, the first granularity) is a multiple of 4. For example, the first granularity may include four RBs, eight RBs, or 16 RBs. The ratio R of the first granularity to the second granularity is 1 or 2. Therefore, the quantity of RBs included in the second granularity is an even number. In addition, a minimum pilot density defined in the current protocol is 0.5. In other words, one RB in every two RBs carries a reference signal. Therefore, it can be ensured that a pilot density of each third frequency domain unit obtained by dividing a complete first-type frequency domain unit is the preconfigured pilot density.

It should be noted that dividing the first-type frequency domain unit into the plurality of second-type frequency domain units is an operation performed when the ratio R of the first granularity to the second granularity is not 1. If the ratio R of the first granularity to the second granularity is 1, in other words, the first granularity is equal to the second granularity, the terminal device does not need to perform operation 430. Embodiments of this application are mainly for a case in which the ratio R of the first granularity to the second granularity is not 1.

Optionally, when the granularity of the first frequency domain unit is less than the preconfigured first granularity, the terminal device divides only the one or more second frequency domain units into the plurality of third frequency domain units, and does not divide the first frequency domain unit.

In other words, the terminal device may first determine whether the first frequency domain unit is a complete first-type frequency domain unit. When the first frequency domain unit is an incomplete first-type frequency domain unit, the first frequency domain unit is not divided, and only the second frequency domain unit is divided.

It should be understood that the terminal device may alternatively not predetermine whether the granularity of the first frequency domain unit is less than the preconfigured first granularity. In other words, regardless of whether the granularity of the first frequency domain unit is less than the first granularity, the terminal device may not divide the first frequency domain unit, but divide only the second frequency domain unit.

Figure 6:
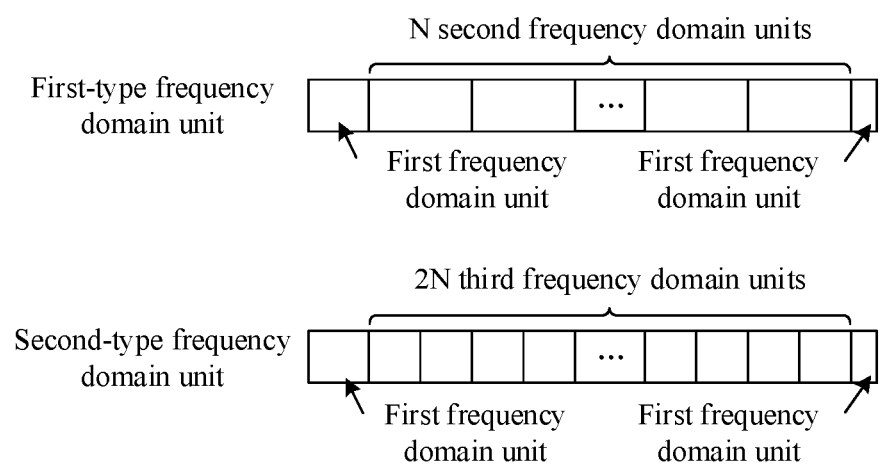
FIG. 6 is a schematic diagram of dividing reporting bandwidth into a plurality of second-type frequency domain units according to an embodiment of this application.

FIG. 6 is a schematic diagram of dividing reporting bandwidth into a plurality of second-type frequency domain units. As shown in the figure, the reporting bandwidth includes N+2 first-type frequency domain units. The N+2 first-type frequency domain units specifically include two first frequency domain units and N second frequency domain units. A granularity of each of the two first frequency domain units is less than a preconfigured first granularity. Therefore, the two first frequency domain units are not divided. The two first frequency domain units may be directly considered as second-type frequency domain units for processing. A granularity of each of the N second frequency domain units other than the two first frequency domain units in the reporting bandwidth is the preconfigured first granularity. Therefore, the N second frequency domain units may be divided based on a predetermined second granularity. FIG. 6 shows an example in which R is 2. To be specific, the second granularity is ½ of the first granularity. The N second frequency domain units may be divided into 2N third frequency domain units. In other words, each of the N second frequency domain units is divided into two third frequency domain units whose sizes are the same. A granularity of each third frequency domain unit is the second granularity. Therefore, the N+2 first-type frequency domain units may be divided into 2N+2 second-type frequency domain units. In addition, granularities of the two second-type frequency domain units at an edge of the reporting bandwidth are not necessarily the predetermined second granularity. It should be understood that FIG. 6 is shown only for ease of understanding, and shall not constitute any limitation on this application.

It can be learned that, if a quantity of the first-type frequency domain units is $N_{SB}$ (where $N_{SB}$ is a positive integer), and a ratio of the first granularity to the second granularity is R, a quantity $N_3$ (where $N_3$ is a positive integer) of the second-type frequency domain units may be $N_3=(N_{SB}-a)\ast R+a$, where a represents a quantity of incomplete first-type frequency domain units at the edge of the reporting bandwidth, and a is a positive integer. If R is 2, the foregoing formula may be simplified as: $N_3=2N_{SB}-a$. In operation 440, the network device determines the plurality of second-type frequency domain units on which reporting of the PMI is based in the reporting bandwidth. The plurality of second-type frequency domain units include the one or more first frequency domain units and the plurality of third frequency domain units obtained by dividing the one or more second frequency domain units.

It should be understood that a specific process in which the network device determines the second-type frequency domain units in operation 440 is similar to a specific process in which the terminal device determines the second-type frequency domain units in operation 430. For brevity, details are not described herein again.

Therefore, each of the terminal device and the network device may determine, based on the reporting bandwidth, the second-type frequency domain units on which reporting of the PMI is based. Then, the terminal device may report the PMI based on the determined second-type frequency domain units, and the network device may determine, based on the received PMI and the foregoing determined second-type frequency domain units, a precoding matrix corresponding to each second-type frequency domain unit.

In an implementation, for each second-type frequency domain unit, the terminal device may estimate a downlink channel based on a received reference signal. The terminal device may perform singular value decomposition (SVD) on the downlink channel or a covariance matrix of the downlink channel, or perform eigenvalue decomposition (EVD) on a covariance matrix of the downlink channel, to determine a precoding matrix corresponding to the second-type frequency domain unit. The precoding matrix is determined based on a reference signal received on the second-type frequency domain unit. Therefore, for the second-type frequency domain unit, the precoding matrix is a precoding matrix that adapts to the channel.

It should be understood that a specific process in which the terminal device performs channel measurement and reporting based on the reference signal may be the same as that in the current technology. For example, the PMI may be reported in a feedback manner defined in a type I codebook, a type II codebook, a dual-domain compressed codebook used in current standard progress, or the like defined in the current protocol. For brevity, details are not described herein. In addition, a specific method for determining the precoding matrix by the terminal device and indicating the precoding matrix is not limited in this application.

It should be further understood that the foregoing specific method for determining the precoding matrix by the terminal device and the codebooks on which reporting of the PMI is based are merely examples, and shall not constitute any limitation on this application. For a specific process in which the terminal device generates the PMI and the network device determines the precoding matrix based on the PMI, refer to the current technology. For brevity, details are not described herein.

Therefore, in the technical solution provided in the embodiments of this application, the first frequency domain unit at the edge of the reporting bandwidth is separately processed. Specifically, in the method provided in this embodiment of this application, the first frequency domain unit is not divided, to ensure that a pilot density is greater than or equal to the preconfigured pilot density, thereby helping obtain an accurate PMI feedback when the terminal device performs channel measurement on each second-type frequency domain unit. The network device may determine, based on the PMI feedback, the precoding matrix corresponding to each second-type frequency domain unit, to use the precoding matrix for data transmission. Therefore, this helps improve data transmission performance.

Actually, when a granularity of the first or the last frequency domain unit in the reporting bandwidth is the preconfigured first granularity, according to the method provided in the embodiments of this application, the first or the last frequency domain unit may not be divided. In this case, the granularity of the first frequency domain unit is the preconfigured first granularity. After the first frequency domain unit is directly used as the second-type frequency domain unit, the granularity of the second-type frequency domain unit is also the first granularity.

Figure 7A:
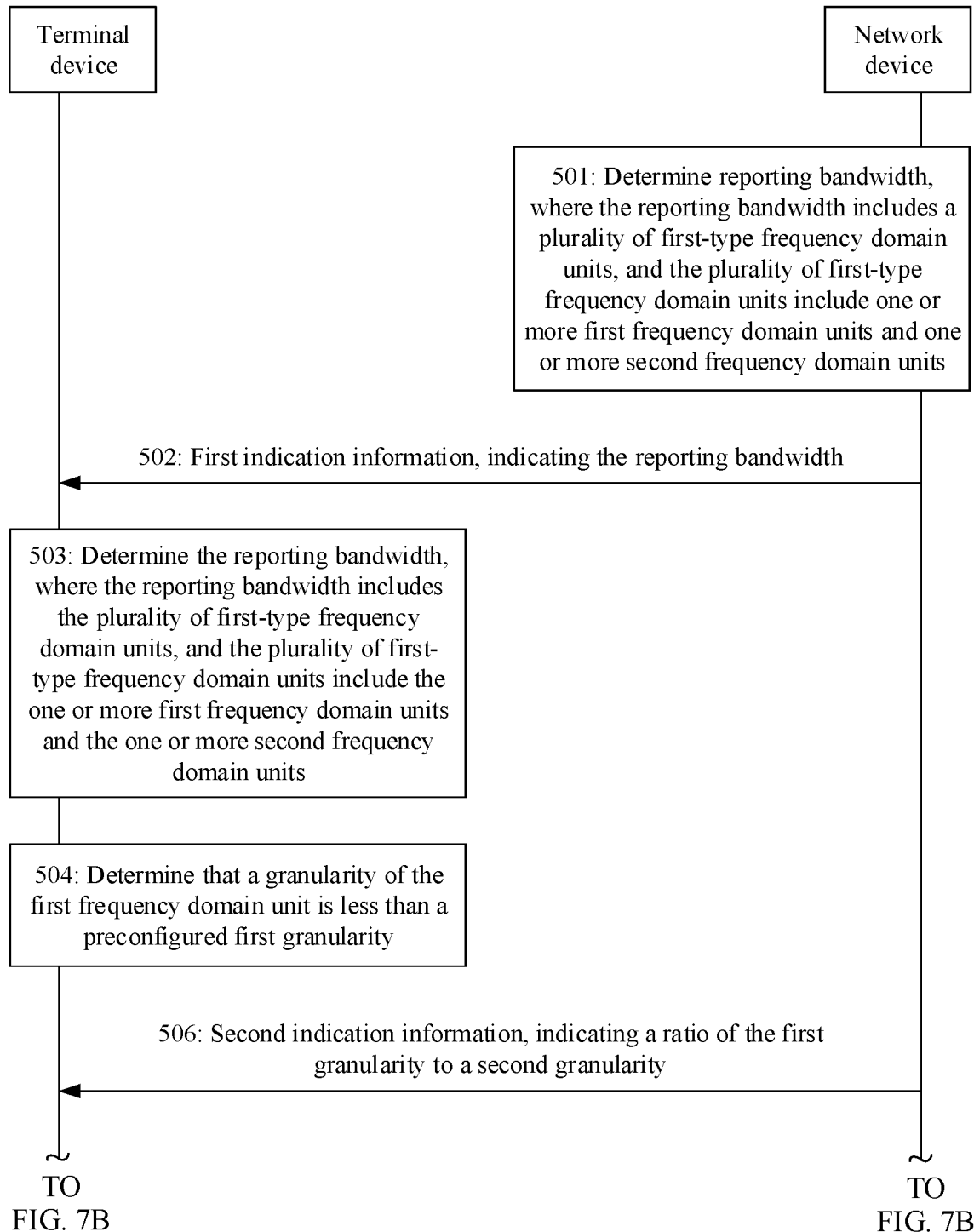

For better understanding of the method provided in the embodiments of this application, the following describes in more detail the communication method 400 provided in the foregoing embodiment with reference to FIG. 7A and FIG. 7B.

FIG. 7A and FIG. 7B are a schematic flowchart of a communication method 500 according to an embodiment of this application from a perspective of interaction between devices. As shown in the figure, the method 500 shown in FIG. 7A and FIG. 7B may include operation 501 to operation 510. The following describes the method 500 in detail with reference to the accompanying drawings.

In operation 501, a network device determines reporting bandwidth, where the reporting bandwidth includes a plurality of first-type frequency domain units on which reporting of a CQI is based.

Specifically, the plurality of first-type frequency domain units include one or more first frequency domain units and one or more second frequency domain units. A granularity of the first frequency domain unit may be less than a preconfigured first granularity. A granularity of the second frequency domain unit may be equal to the preconfigured first granularity. In other words, the plurality of first-type frequency domain units may include one or more incomplete first-type frequency domain units and one or more complete first-type frequency domain units.

In operation 502, the network device sends first indication information, where the first indication information is used to indicate the reporting bandwidth. Correspondingly, a terminal device receives the first indication information.

For specific descriptions of operation 501 and operation 502, refer to operation 410 and operation 420 in the foregoing method 400. For brevity, details are not described herein again.

In operation 503, the terminal device determines the reporting bandwidth based on the first indication information.

The terminal device may determine the reporting bandwidth based on the first indication information sent by the network device. Because a specific indication manner of the reporting bandwidth is described above in detail with reference to specific signaling, for brevity, details are not described herein again.

In operation 504, the terminal device determines that the granularity of the first frequency domain unit is less than the preconfigured first granularity.

The first frequency domain unit may be the first frequency domain unit and/or the last frequency domain unit in the reporting bandwidth. After receiving configuration signaling of the reporting bandwidth, the terminal device may determine, based on the preconfigured first granularity, whether a granularity of a frequency domain unit at an edge of the reporting bandwidth is the preconfigured first granularity. The first-type frequency domain unit at the edge of the reporting bandwidth herein may include, for example, the first and the last first-type frequency domain units in the reporting bandwidth.

When a quantity of RBs included in the first-type frequency domain unit at the edge of the reporting bandwidth is less than a quantity of RBs included in the preconfigured first granularity, it may be considered that the first-type frequency domain unit is an incomplete first-type frequency domain unit.

It may be understood that the reporting bandwidth may include one incomplete first-type frequency domain unit, may include two incomplete first-type frequency domain units, or may not include any incomplete first-type frequency domain unit. The method provided in the embodiments of this application is mainly a technical solution proposed for a case in which the reporting bandwidth includes an incomplete first-type frequency domain unit. When the reporting bandwidth does not include any incomplete first-type frequency domain unit, division may be performed based on a preconfigured second granularity. Details are not described herein.

In other words, the foregoing first frequency domain unit may be one first-type frequency domain unit, or may be two first-type frequency domain units.

Corresponding to the first frequency domain unit and the second frequency domain unit in the foregoing method 400, the reporting bandwidth includes one or more first frequency domain units and one or more second frequency domain units. A granularity of each second frequency domain unit is the first granularity.

In operation 505, the terminal device divides one or more first-type frequency domain units other than the first frequency domain unit in the reporting bandwidth into a plurality of second-type frequency domain units.

Specifically, the terminal device may divide each complete first-type frequency domain unit in the reporting bandwidth into a plurality of second-type frequency domain units based on the predetermined second granularity. A granularity of each second-type frequency domain unit obtained by dividing each complete first-type frequency domain unit by the terminal device is the second granularity. The terminal device may not divide an incomplete first-type frequency domain unit. In other words, the terminal device may directly determine the first frequency domain unit as a second-type frequency domain unit. A granularity of the first frequency domain unit may be equal to the second granularity, or may be greater than or less than the second granularity. Therefore, a granularity of the second-type frequency domain unit directly determined by the first frequency domain unit is not necessarily the predetermined second granularity. In other words, an actual granularity of the second-type frequency domain unit is not necessarily the second granularity.

Corresponding to the first frequency domain unit and the third frequency domain unit in the foregoing method 400, the plurality of second-type frequency domain units obtained by dividing the reporting bandwidth may include the one or more first frequency domain units and a plurality of third frequency domain units. A granularity of each third frequency domain unit is the second granularity.

In addition, a ratio R of the first granularity to the second granularity may be predefined, for example, predefined in a protocol. In this case, the ratio R of the first granularity to the second granularity may be a fixed value. Alternatively, the ratio R of the first granularity to the second granularity may be preconfigured by the network device. In this case, the ratio R of the first granularity to the second granularity may be a variable.

If the ratio R of the first granularity to the second granularity is preconfigured by the network device, optionally, before operation 505, the method further includes operation 506: The terminal device receives second indication information, where the second indication information is used to indicate that the ratio R of the first granularity to the second granularity is not 1. Correspondingly, the network device sends the second indication information, where the second indication information is used to indicate that the ratio R of the first granularity to the second granularity is not 1.

A specific process of indicating the ratio R of the first granularity to the second granularity is described in detail in the foregoing method 400. For brevity, details are not described herein again.

After determining the ratio R of the first granularity to the second granularity, the terminal device may further determine the second granularity. Optionally, before operation 505, the method further includes: The terminal device determines the second granularity.

Specifically, the terminal device may determine the second granularity based on the preconfigured first granularity and the ratio R of the first granularity to the second granularity. A quantity of RBs included in the second granularity is denoted as, for example, $N_2$; the quantity of RBs included in the first granularity is denoted as, for example, $N_1$; and $N_1$ may be determined based on the preconfigured first granularity. In this case, $N_2=N_1/R$. For example, if $N_1=8$ and $R=2$, $N_2=4$.

Because the ratio of the first granularity to the second granularity may be preconfigured by using signaling, when performing operation 505 to divide the complete first-type frequency domain unit other than the first frequency domain unit, the terminal device may alternatively divide, directly based on the ratio R of the preconfigured first granularity to the second granularity, the one or more first-type frequency domain units other than the first frequency domain unit in the reporting bandwidth into the plurality of second-type frequency domain units. In other words, in operation 505, that the terminal device divides one or more first-type frequency domain units other than the first frequency domain unit in the reporting bandwidth into a plurality of second-type frequency domain units based on the predetermined second granularity may be replaced with the following: The terminal device divides the one or more first-type frequency domain units other than the first frequency domain unit in the reporting bandwidth into the plurality of second-type frequency domain units based on the ratio R of the preconfigured first granularity to the second granularity.

For example, when R=2, each complete first-type frequency domain unit may be directly divided into two second-type frequency domain units whose sizes are the same.

The ratio R of the first granularity to the second granularity may be configured, for example, by using higher layer signaling, such as an RRC message. This is not limited in this application.

In addition, the network device may further configure a pilot density by using higher layer signaling, such as an RRC message. The terminal device may receive a reference signal on the reporting bandwidth based on the preconfigured pilot density, to perform channel measurement.

However, as described above, the first frequency domain unit at the edge of the reporting bandwidth is not a complete first-type frequency domain unit. If such a frequency domain unit is divided, a pilot density of a second-type frequency domain unit obtained through the division may be less than the preconfigured pilot density. Therefore, in this embodiment of this application, when the granularity of the first-type frequency domain unit at the edge of the reporting bandwidth is less than the preconfigured first granularity, the first-type frequency domain unit is not divided, so that an original pilot density of the first-type frequency domain unit can still be maintained. In other words, it can be ensured that the pilot density of the first frequency domain unit is greater than or equal to the preconfigured pilot density, and there is no possibility that a pilot density of one or more of second-type frequency domain units is less than the preconfigured pilot density because the plurality of second-type frequency domain units are obtained by dividing the incomplete first-type frequency domain unit.

Actually, the terminal device may alternatively not determine whether the granularity of the first frequency domain unit at the edge of the reporting bandwidth is less than the preconfigured first granularity. In other words, when the granularity of the first frequency domain unit is the preconfigured first granularity, the terminal device may still not divide the first frequency domain unit. This can reduce calculation complexity of the terminal device. In this case, the terminal device may directly perform operation 505 without performing operation 504.

In operation 507, the terminal device sends a PMI, where the PMI is used to indicate a precoding matrix corresponding to each frequency domain unit in the first frequency domain unit and the plurality of second-type frequency domain units. Correspondingly, in operation 507, the network device receives the PMI.

Specifically, the terminal device may perform channel measurement based on each second-type frequency domain unit determined in operation 505. The first frequency domain unit also belongs to the second-type frequency domain units, but the granularity of the first frequency domain unit may not be the second granularity. However, the terminal device may still perform channel measurement based on a reference signal received on the first frequency domain unit, to determine the PMI. In other words, the PMI may be used to indicate a precoding matrix corresponding to each of the plurality of second-type frequency domain units including the first frequency domain unit.

It should be understood that, for a specific process in which the terminal device performs channel measurement and reporting based on the reference signal, reference may be made to the current technology. For example, the PMI may be reported in a feedback manner defined in a type I codebook, a type II codebook, a dual-domain compressed codebook used in current standard progress, or the like defined in a current protocol. The solution in the embodiments of this application does not concern a specific process of generating the PMI by the terminal device. Therefore, for brevity, details are not described herein. In addition, a specific method for determining the precoding matrix by the terminal device and indicating the precoding matrix is not limited in this application.

Optionally, the PMI is carried in a CSI report. For example, the terminal device may report the PMI to the network device by using the CSI report. For a specific method for reporting the PMI by the terminal device by using the CSI report, refer to the current technology. For brevity, details are not described herein.

After the network device receives the PMI, in operation 508, the network device may determine, based on the PMI, a precoding matrix corresponding to the first frequency domain unit and a precoding matrix corresponding to each second-type frequency domain unit (namely, the foregoing third frequency domain unit) other than the first frequency domain unit. In other words, the network device may determine, based on the PMI, the precoding matrix corresponding to each of the plurality of second-type frequency domain units.

Before determining the precoding matrix corresponding to each second-type frequency domain unit, the network device may first determine the granularity of each second-type frequency domain unit.

Therefore, the method 500 further includes the following operations:

Operation 509: The network device determines that the granularity of the first frequency domain unit is less than the preconfigured first granularity.

Operation 510: The network device divides the one or more first-type frequency domain units other than the first frequency domain unit in the reporting bandwidth into the plurality of second-type frequency domain units.

A specific process in which the network device performs operation 509 and operation 510 is similar to the foregoing specific process in which the terminal device performs operation 504 and operation 505. Therefore, for brevity, details are not described herein again.

The figure is merely an example in which operation 509 and operation 510 are shown between operation 507 and operation 508. However, this shall not constitute any limitation on this application. Operation 509 and operation 510 may be alternatively performed before operation 507, or may be performed after operation 507, provided that operation 509 and operation 510 are performed before operation 508.

After determining the granularity of each second-type frequency domain unit, the network device may determine, based on the PMI, the precoding matrix corresponding to each second-type frequency domain unit. A method for determining, by the network device based on the PMI, the precoding matrix corresponding to the second-type frequency domain unit corresponds to the foregoing method for performing channel measurement and reporting by the terminal device. A codebook type and a feedback manner on which reporting of the PMI is based may be pre-agreed by the network device and the terminal device, or may be predefined in a protocol. The terminal device and the network device may separately generate and decipher the PMI based on a same codebook type and a same feedback manner.

Therefore, in the method provided in this embodiment of this application, the first frequency domain unit at the edge of the reporting bandwidth is separately processed, and the first frequency domain unit at the edge of the reporting bandwidth may not be divided, to ensure that a pilot density is greater than or equal to the preconfigured pilot density, thereby helping obtain an accurate PMI feedback when the terminal device performs channel measurement on each second-type frequency domain unit. The network device may determine, based on the PMI feedback, the precoding matrix corresponding to each second-type frequency domain unit, to use the precoding matrix for data transmission. Therefore, this helps improve data transmission performance.

Actually, a pilot density does not necessarily decrease after each first frequency domain unit is divided. In some cases, even if a first frequency domain unit is divided into a plurality of second-type frequency domain units, a pilot density in each second-type frequency domain unit may still be greater than or equal to the preconfigured pilot density.

Figure 8:
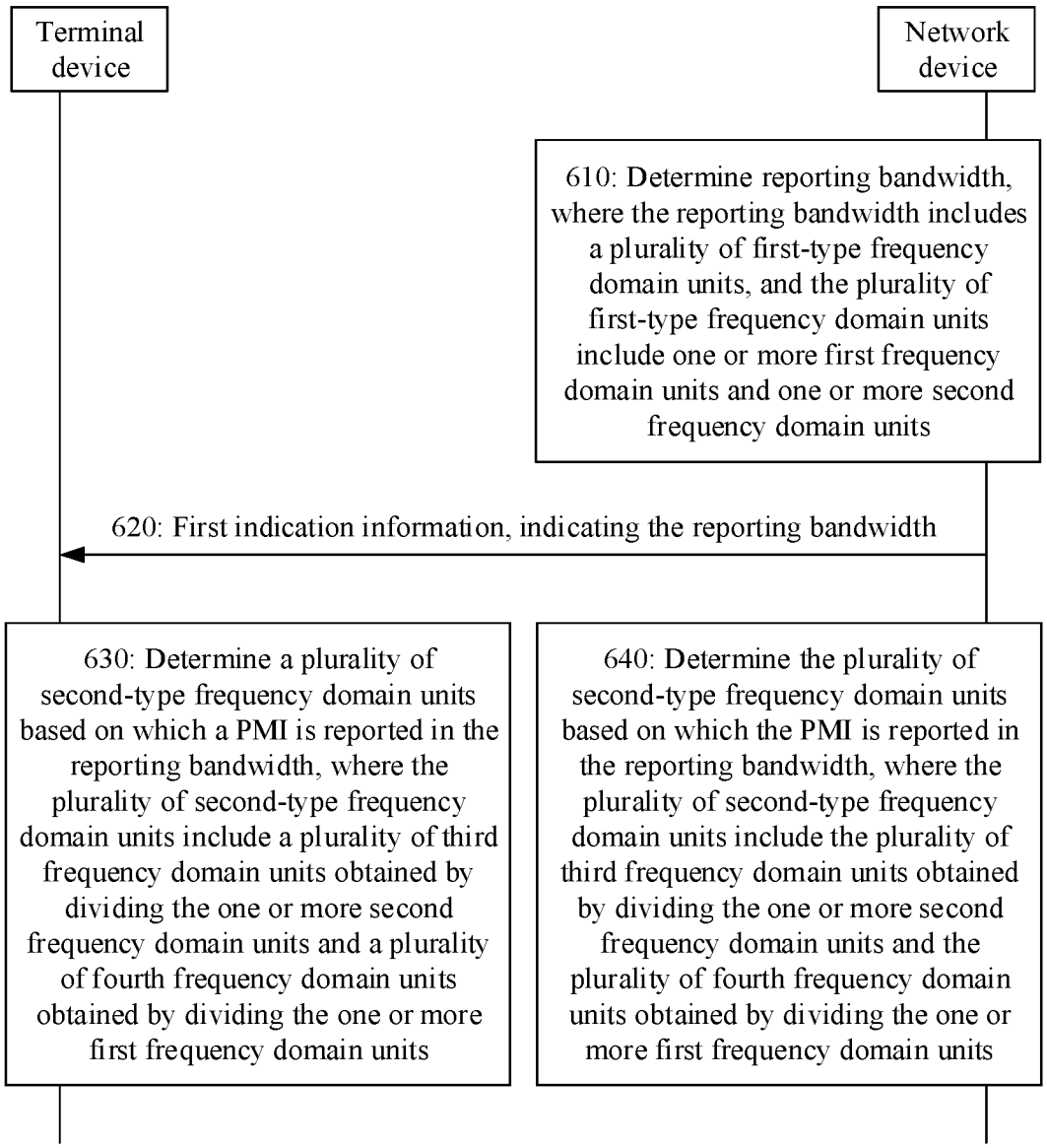
FIG. 8 is a schematic flowchart of a communication method according to still another embodiment of this application.

Embodiments of this application further provide another communication method. FIG. 8 is a schematic flowchart of a communication method 600 according to another embodiment of this application from a perspective of interaction between devices. As shown in the figure, the method 600 shown in FIG. 8 may include operation 610 to operation 640. The following describes the method 600 in detail with reference to the accompanying drawings.

In operation 610, a network device determines reporting bandwidth, where the reporting bandwidth includes a plurality of first-type frequency domain units on which reporting of a CQI is based.

Specifically, the plurality of first-type frequency domain units include one or more first frequency domain units and one or more second frequency domain units. A granularity of the first frequency domain unit may be less than a preconfigured first granularity, or may be equal to a preconfigured first granularity. A granularity of the second frequency domain unit is a second granularity.

In operation 620, the network device sends first indication information, where the first indication information is used to indicate the reporting bandwidth. Correspondingly, the terminal device receives the first indication information.

For specific descriptions of operation 610 and operation 620, refer to operation 410 and operation 420 in the foregoing method 400. For brevity, details are not described herein again.

In operation 630, a terminal device determines a plurality of second-type frequency domain units on which reporting of a PMI is based in the reporting bandwidth. The plurality of second-type frequency domain units include a plurality of third frequency domain units obtained by dividing the one or more second frequency domain units and a plurality of fourth frequency domain units determined from the one or more first frequency domain units. At least one of the one or more first frequency domain units meets a preset condition. At least some of the plurality of fourth frequency domain units are obtained by dividing the first frequency domain unit that meets the preset condition.

In operation 640, the network device determines the plurality of second-type frequency domain units on which reporting of the PMI is based in the reporting bandwidth. The plurality of second-type frequency domain units include the plurality of third frequency domain units obtained by dividing the one or more second frequency domain units and the plurality of fourth frequency domain units determined from the one or more first frequency domain units. At least one of the one or more first frequency domain units meets the preset condition. At least some of the plurality of fourth frequency domain units are obtained by dividing the first frequency domain unit that meets the preset condition. There may be a first frequency domain unit that does not meet the preset condition in the one or more first frequency domain units, and the first frequency domain unit that does not meet the preset condition may be directly used as a fourth frequency domain unit.

The second frequency domain unit is a complete first-type frequency domain unit, and therefore, the terminal device and the network device may divide the one or more second frequency domain units into the plurality of third frequency domain units based on the method described in operation 430 and operation 440 in the method 400.

However, different from the methods 400 and 500, in the method 600, the terminal device and the network device may separately divide the first frequency domain unit when determining that the first frequency domain unit meets some preset conditions. Therefore, the terminal device and the network device may divide at least one of the one or more first frequency domain units.

The plurality of fourth frequency domain units may be obtained by dividing the at least one of the one or more first frequency domain units. The terminal device and the network device may divide the first frequency domain unit based on the predetermined second granularity, or may divide the first frequency domain unit based on a ratio of the first granularity to the second granularity. Based on different division manners, the fourth frequency domain unit may have different granularities.

If the first frequency domain unit is divided based on the second granularity, a granularity of at least one of the plurality of second-type frequency domain units is the second granularity, and a granularity of at least one of the plurality of second-type frequency domain units is less than the second granularity. In other words, a granularity of the fourth frequency domain unit may be less than or equal to the second granularity. In addition, granularities of the plurality of fourth frequency domain units may be different from each other.

It may be understood that if the first frequency domain unit is divided based on the second granularity, when the granularity of the first frequency domain unit is less than or equal to the second granularity, the first frequency domain unit may not be divided. The first frequency domain unit may be directly used as the fourth frequency domain unit. The granularity of the fourth frequency domain unit may be less than the second granularity, or may be equal to the second granularity.

If the first frequency domain unit is divided based on the ratio of the first granularity to the second granularity, when the granularity of the first frequency domain unit is less than the preconfigured first granularity, a granularity determined based on the granularity of the first frequency domain unit and the ratio of the first granularity to the second granularity is less than the second granularity. In this case, a granularity of each of the plurality of second-type frequency domain units obtained by dividing the first frequency domain unit may be less than the second granularity. A quantity $N_3$ of the second-type frequency domain units obtained through division may meet the following formula: $N_3 = N_{SB} > R$.

It should be understood that both the third frequency domain unit and the fourth frequency domain unit are second-type frequency domain units. In this embodiment of this application, only for ease of distinguishment, second-type frequency domain units obtained by dividing the second frequency domain unit are denoted as the third frequency domain units, and second-type frequency domain units determined from the first frequency domain unit (including those obtained through division and not obtained through division) are denoted as the fourth frequency domain units. A granularity of the third frequency domain unit is the second granularity, and the granularity of the fourth frequency domain unit may be less than the second granularity, or may be equal to the second granularity. In addition, when two or more fourth frequency domain units are obtained by dividing the first frequency domain unit in the reporting bandwidth, granularities of the two or more fourth frequency domain units are not necessarily the same.

A person skilled in the art may understand that, when a boundary of the reporting bandwidth is not aligned with a boundary of the first-type frequency domain unit, granularities of the first and the last first-type frequency domain units in the reporting bandwidth may be different. Granularities of the two first-type frequency domain units may be both greater than the second granularity, or may be both less than or equal to the second granularity. Alternatively, a granularity of one of the two first-type frequency domain units may be greater than the second granularity, and a granularity of the other one is less than or equal to the second granularity. Therefore, the first-type frequency domain unit whose granularity is greater than the second granularity may be divided based on the second granularity, and the frequency domain unit whose granularity is less than or equal to the second granularity may not be divided.

As described above, the terminal device and the network device may separately divide the first frequency domain unit when determining that the first frequency domain unit meets some preset conditions. The following lists some preset conditions as examples.

For example, the preset condition may be that a pilot density preconfigured for the first frequency domain unit is greater than or equal to 1.

It should be noted that the pilot density preconfigured for the first frequency domain unit is the same as a pilot density preconfigured for the reporting bandwidth. Therefore, that a pilot density preconfigured for the first frequency domain unit is greater than or equal to 1 may be replaced with that a preconfigured pilot density is greater than or equal to 1, or that the pilot density preconfigured for the reporting bandwidth is greater than or equal to 1.

When the pilot density is greater than or equal to 1, each RB carries a reference signal. Regardless of how the first frequency domain unit is divided, the pilot density may remain unchanged.

For another example, the preset condition may be that a quantity of RBs included in the first frequency domain unit is a multiple of 4.

As described above, if the pilot density is greater than or equal to 1, when the quantity of RBs included in the first frequency domain unit is any value, the pilot density may remain unchanged regardless of how the first frequency domain unit is divided.

If the pilot density is less than 1, a pilot density defined in a current protocol is 0.5. In other words, one RB in every two RBs carries a reference signal. In addition, a quantity of RBs that can be included in the first-type frequency domain unit (that is, the CQI subband granularity described above) currently defined in the protocol is 4, 8, or 16. When the granularity ratio R is not 1, R is 2. Therefore, it may be determined that a quantity of RBs included in the second granularity may be 2, 4, or 8. In other words, the first frequency domain unit is further divided into two second-type frequency domain units. If the quantity of RBs included in the first frequency domain unit is a multiple of 4, regardless of whether the first frequency domain unit is divided into the two second-type frequency domain units based on the second granularity or is evenly divided into the two second-type frequency domain units, a granularity of each second-type frequency domain unit is always a multiple of 2. This can ensure that one RB in every two RBs carries a reference signal. In other words, this can ensure that the pilot density is always 0.5.

On the contrary, if the quantity of RBs included in the first frequency domain unit is not a multiple of 4, after the first frequency domain unit is divided into the two second-type frequency domain units, a quantity of RBs included in the second-type frequency domain unit may not be a multiple of 2. As a result, it cannot be ensured that the pilot density is greater than or equal to 0.5.

In other words, when the preconfigured pilot density is less than 1, the preset condition may be that the quantity of RBs included in the first frequency domain unit is a multiple of 4.

In other words, when the quantity of RBs included in the first frequency domain unit is not a multiple of 4 and the pilot density is less than 1, the first frequency domain unit is not divided.

For another example, the preset condition is that a quantity of RBs included in the first frequency domain unit is an odd number.

As described above, if the pilot density is greater than or equal to 1, when the quantity of RBs included in the first frequency domain unit is any value, the pilot density may remain unchanged regardless of how the first frequency domain unit is divided.

If the pilot density is less than 1, a pilot density defined in a current protocol is 0.5. In other words, one RB in every two RBs carries a reference signal. If the first frequency domain unit is configured as a frequency domain unit for which a CQI is to be reported, it indicates that the pilot density in the first frequency domain unit is greater than or equal to the preconfigured pilot density. If the quantity of RBs included in the first frequency domain unit is an odd number, it may be inferred that, in the first frequency domain unit, an odd number of RBs carry a reference signal, an even number of RBs carry no reference signals, and a quantity of the RBs carrying a reference signal is 1 greater than a quantity of the RBs carrying no reference signals. In other words, the pilot density of the first frequency domain unit is greater than 0.5.

When the granularity ratio R is not 1, R is 2. In this case, if the first frequency domain unit is divided into two second-type frequency domain units, there is necessarily one second-type frequency domain unit that includes an odd number of RBs. In the odd number of RBs, a quantity of RBs that carry a reference signal is 1 greater than a quantity of RBs that carry no reference signals, and a pilot density is greater than 0.5. The other second-type frequency domain unit includes an even number of RBs, and a pilot density is 0.5. Therefore, regardless of how the first frequency domain unit is divided, it can always be ensured that the pilot density of each of the two second-type frequency domain units obtained through division is greater than or equal to the preconfigured pilot density.

Figure 9:
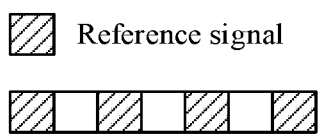
FIG. 9 is a schematic diagram of a case in which a pilot density is greater than 0.5 according to an embodiment of this application.

For example, FIG. 9 shows an example in which the pilot density in the first frequency domain unit is greater than 0.5. The first frequency domain unit includes seven RBs. To ensure that a pilot density of the seven RBs is greater than or equal to 0.5, four of the seven RBs carry reference signals, and three of the seven RBs carry no reference signals. In addition, one RB in every two RBs carries a reference signal. The seven RBs may be divided into three RBs and four RBs, may be divided into two RBs and five RBs, or may be divided into one RB and six RBs. It can be learned from the figure that, regardless of how the first frequency domain unit is divided, it can always be ensured that pilot densities of two second-type frequency domain units obtained through division are greater than or equal to the preconfigured pilot density 0.5.

In other words, when the pilot density is less than 1, the preset condition may be that the quantity of RBs included in the first frequency domain unit is an odd number.

In other words, when the pilot density is less than 1 and the quantity of RBs included in the first frequency domain unit is an even number, the first frequency domain unit is not divided.

Further, the foregoing two preset conditions may be used in combination. For example, when the pilot density is less than 1 and the quantity of RBs included in the first frequency domain unit is an even number, but is not a multiple of 4, the first frequency domain unit is not divided.

For another example, when division is performed based on the predetermined second granularity, the preset condition is that a quantity of RBs included in the first frequency domain unit is an even number. The second granularity is a granularity determined based on the preconfigured first granularity and the ratio R of the first granularity to the second granularity.

As described above, if the pilot density is greater than or equal to 1, when the quantity of RBs included in the first frequency domain unit is any value, the pilot density may remain unchanged regardless of how the first frequency domain unit is divided.

If the pilot density is less than 1, a pilot density defined in a current protocol is 0.5. In other words, one RB in every two RBs carries a reference signal. If the first frequency domain unit is configured as a frequency domain unit for which a CQI is to be reported, it indicates that the pilot density in the first frequency domain unit is greater than or equal to the preconfigured pilot density. If the quantity of RBs included in the first frequency domain unit is an even number, it may be inferred that one RB in every two RBs in the first frequency domain unit carries a reference signal, and a quantity of RBs carrying a reference signal is the same as a quantity of RBs carrying no reference signals. In other words, the pilot density of the first frequency domain unit is 0.5.

In addition, a quantity of RBs that can be included in the first-type frequency domain unit (that is, the CQI subband granularity described above) currently defined in the protocol is 4, 8, or 16. When the granularity ratio R is not 1, R is 2. Therefore, it may be determined that a quantity of RBs included in the second granularity may be 2, 4, or 8. In this case, even if the quantity of RBs included in the first frequency domain unit is not a multiple of 4, if the first frequency domain unit is divided into two second-type frequency domain units based on the second granularity, quantities of RBs included in the two second-type frequency domain units obtained through division are both even numbers. When the quantity of RBs included in the second-type frequency domain unit is an even number, the pilot density is still 0.5.

In other words, when the pilot density is less than 1, and the first frequency domain unit is divided based on the second granularity, the preset condition may be that the quantity of RBs included in the first frequency domain unit is an even number.

In addition, when division is performed based on the second granularity, the preset condition may further include: The quantity of RBs included in the first frequency domain unit is greater than that of RBs included in the second granularity.

It may be understood that, if the first frequency domain unit is divided based on the second granularity, it is pointless to divide the first frequency domain unit when the quantity of RBs included in the first frequency domain unit is less than or equal to the quantity of RBs included in the second granularity. Therefore, the first frequency domain unit may be divided when the quantity of RBs included in the first frequency domain unit is greater than the quantity of RBs included in the second granularity, to obtain the plurality of second-type frequency domain units. The plurality of second-type frequency domain units obtained through division may include at least one second-type frequency domain unit whose granularity is the second granularity and at least one second-type frequency domain unit whose granularity is less than the second granularity.

To sum up, the preset condition for dividing the first frequency domain unit may be one of the following listed items:

a. The preconfigured pilot density is greater than or equal to 1.

b. The quantity of RBs included in the first frequency domain unit is a multiple of 4.

c. The quantity of RBs included in the first frequency domain unit is an odd number.

It should be understood that the foregoing lists some preset conditions as examples merely for understanding, but shall not constitute any limitation on this application. For example, that the granularity of the first frequency domain unit is greater than the second granularity may be alternatively used as the preset condition for dividing the first frequency domain unit. For another example, the preset condition may be: When the quantity of RBs included in the first frequency domain unit is an even number, the first frequency domain unit is divided; when the quantity of RBs included in the first frequency domain unit is an odd number, the first frequency domain unit is not divided.

In addition, the preset conditions listed above may be alternatively used in combination, provided that no conflict exists. For example, the preset condition may be that the granularity of the first frequency domain unit is greater than the second granularity, and the quantity of RBs included in the first frequency domain unit is a multiple of 4. Based on a principle that the pilot density of the second-type frequency domain unit obtained through division is greater than or equal to the preconfigured pilot density, a person skilled in the art may further figure out more possible preset conditions. For brevity, other preset conditions are not listed herein.

As described above, the terminal device may divide at least one of the one or more first frequency domain units based on the second granularity, to obtain the plurality of fourth frequency domain units, and may divide the one or more second frequency domain units based on the second granularity, to obtain the plurality of third frequency domain units. Before performing the division, the terminal device may first determine the second granularity.

The terminal device may determine the second granularity based on the preconfigured first granularity and the ratio R of the first granularity to the second granularity. The first granularity may be, for example, configured by the network device by using signaling. For example, a subband granularity (subband size) field in a CSI reporting configuration indicates the first granularity.

The ratio R of the first granularity to the second granularity may be predefined in a protocol, or may be configured by the network device by using signaling.

Optionally, the method further includes: The terminal device receives second indication information, where the second indication information is used to indicate the ratio R of the first granularity to the second granularity. Correspondingly, the network device sends the second indication information.

A specific manner of indicating a value of R by the second indication information is described in detail in the foregoing method 400. Therefore, for brevity, details are not described herein again.

Figure 10:
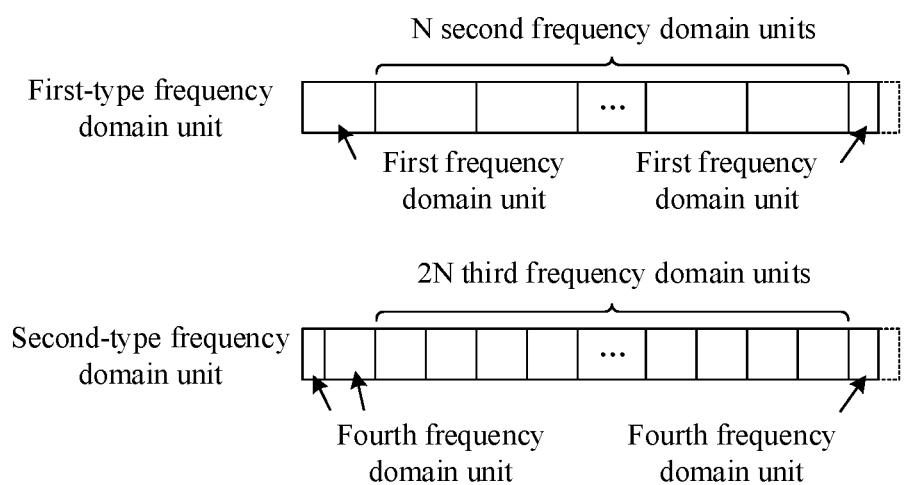
FIG. 10 is another schematic diagram of dividing reporting bandwidth into a plurality of second-type frequency domain units according to an embodiment of this application.

FIG. 10 is a schematic diagram of dividing reporting bandwidth into a plurality of second-type frequency domain units. As shown in the figure, the reporting bandwidth shown in the figure includes N+2 first-type frequency domain units. The N+2 first-type frequency domain units specifically include two first frequency domain units and N second frequency domain units. A granularity of each of the two first frequency domain units is less than a preconfigured first granularity, and a granularity of the other N second frequency domain units is the first granularity.

For ease of description, assuming that the first granularity is eight RBs and R is 2, it may be determined that a second granularity is 4. In the figure, a first frequency domain unit located at a left end of the reporting bandwidth includes five RBs, and a first frequency domain unit located at a right end of the reporting bandwidth includes three RBs. A dotted-line box in the figure shows the second granularity. In this case, a terminal device and a network device may separately divide the first frequency domain unit located in the reporting bandwidth. In an implementation, the first frequency domain unit may be divided based on the second granularity. In this case, the first frequency domain unit located at the left end of the reporting bandwidth may be divided into a third frequency domain unit including four RBs and a fourth frequency domain unit including one RB; the first frequency domain unit located at the right end of the reporting bandwidth includes only three RBs, which is less than a quantity of RBs included in the second granularity, and therefore may not be divided.

Through the foregoing division, the N+2 first-type frequency domain units are divided into 2N+3 second-type frequency domain units. The 2N+3 second-type frequency domain units may include three fourth frequency domain units and 2N third frequency domain units. A granularity of each of the 2N third frequency domain units is the second granularity. In the three fourth frequency domain units, a granularity of one fourth frequency domain unit is the second granularity, and granularities of the other two fourth frequency domain units are less than the second granularity. In addition, it can be ensured that a pilot density of each second-type frequency domain unit is greater than or equal to a preconfigured pilot density.

It should be understood that FIG. 10 is shown only for ease of understanding, and shall not constitute any limitation on this application.

Therefore, each of the terminal device and the network device may determine, based on the reporting bandwidth, the second-type frequency domain units on which reporting of the PMI is based. Then, the terminal device may report the PMI based on the determined second-type frequency domain units, and the network device may determine, based on the received PMI and the foregoing determined second-type frequency domain units, a precoding matrix corresponding to each second-type frequency domain unit.

A process in which the terminal device reports the PMI and the network device determines the precoding matrix based on the PMI is described in the foregoing method 400. Therefore, for brevity, details are not described herein again.

Therefore, in the technical solution provided in the embodiments of this application, the first frequency domain unit at an edge of the reporting bandwidth is separately processed. Specifically, in the method provided in the embodiments of this application, the first frequency domain unit that meets the preset condition is divided into the plurality of second-type frequency domain units, to ensure, to a relatively great extent, that the pilot density is greater than or equal to the preconfigured pilot density, thereby helping obtain an accurate PMI feedback when the terminal device performs channel measurement on each second-type frequency domain unit. The network device may determine, based on the PMI feedback, the precoding matrix corresponding to each second-type frequency domain unit, to use the precoding matrix for data transmission. Therefore, this helps improve data transmission performance.

Figure 11A:
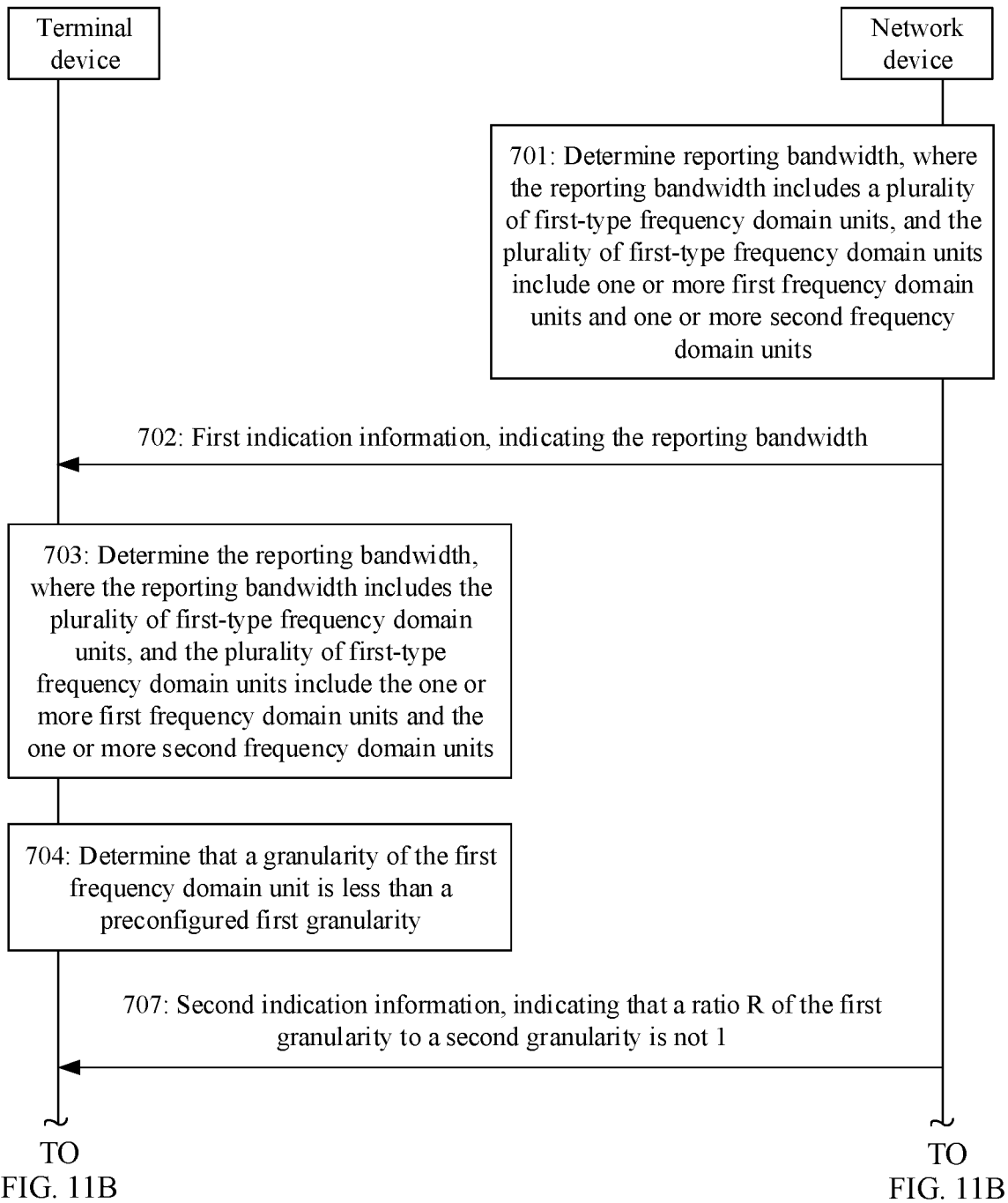

For better understanding of the method provided in the embodiments of this application, the following describes in more detail the communication method 600 provided in the foregoing embodiment, with reference to FIG. 11A and FIG. 11B.

FIG. 11A and FIG. 11B are a schematic flowchart of a communication method 700 according to still another embodiment of this application from a perspective of interaction between devices. As shown in the figure, the method 700 may include operation 701 to operation 712. The following describes the method 700 in detail with reference to the accompanying drawings.

In operation 701, a network device determines reporting bandwidth, where the reporting bandwidth includes a plurality of first-type frequency domain units on which reporting of a CQI is based.

In operation 702, the network device sends first indication information, where the first indication information is used to indicate the reporting bandwidth. Correspondingly, a terminal device receives the first indication information.

For specific descriptions of operation 701 and operation 702, refer to operation 410 and operation 420 in the foregoing method 400. For brevity, details are not described herein again.

In operation 703, the terminal device determines the reporting bandwidth based on the first indication information.

The terminal device may determine the reporting bandwidth based on the first indication information sent by the network device. Because a specific indication manner of the reporting bandwidth is described above in detail, for brevity, details are not described herein again. In operation 704, the terminal device determines that a granularity of a first frequency domain unit is less than a preconfigured first granularity.

The first frequency domain unit is the first or the last frequency domain unit in the reporting bandwidth, the first granularity is a granularity configured for the first-type frequency domain unit, and the first-type frequency domain unit is a frequency domain unit on which reporting of the channel quality indicator CQI is based.

It should be understood that a specific process of operation 704 is the same as that of operation 504 in the foregoing method 500. For brevity, details are not described herein again. In addition, related descriptions for the first frequency domain unit in the foregoing method 500 are still applicable in the method 700. For brevity, details are not described herein again.

In operation 705, when a first frequency domain unit meets a preset condition, the terminal device determines a plurality of second-type frequency domain units based on one or more first frequency domain units, where the plurality of second-type frequency domain units include a plurality of second-type frequency domain units obtained by dividing the at least one first frequency domain unit.

As described above, in some cases, even if a first frequency domain unit is divided into a plurality of second-type frequency domain units, a pilot density in each second-type frequency domain unit may still be greater than or equal to a preconfigured pilot density. For example, there are four RBs in the first frequency domain unit, and a pilot density is 0.5. If the four RBs are evenly divided into two second-type frequency domain units, each second-type frequency domain unit includes two RBs. In this case, pilot densities of the two second-type frequency domain units are still 0.5. Therefore, the first frequency domain unit may be selectively divided. A granularity of at least one of the plurality of second-type frequency domain units obtained by dividing the first frequency domain unit is less than a second granularity. The second granularity is a frequency domain unit granularity predetermined for reporting a PMI. However, it may be understood that, regardless of whether a granularity of the second-type frequency domain unit obtained through division is the second granularity, the terminal device may perform channel measurement and PMI reporting based on each second-type frequency domain unit obtained through division.

The terminal device may divide the first frequency domain unit when the first frequency domain unit meets the preset condition. In other words, the plurality of second-type frequency domain units obtained by dividing the first frequency domain unit may be obtained by dividing all first frequency domain units in the reporting bandwidth, or may be obtained by dividing some of first frequency domain units in the reporting bandwidth. In other words, the plurality of second-type frequency domain units may be determined by using one or more first frequency domain units. The second-type frequency domain units determined by using the one or more first frequency domain units may correspond to the fourth frequency domain units in the foregoing method 600. This is not limited in this application.

The following lists some preset conditions as examples.

For example, the preset condition is that a pilot density preconfigured for the first frequency domain unit is greater than or equal to 1.

It should be noted that the pilot density preconfigured for the first frequency domain unit is the same as a pilot density preconfigured for the reporting bandwidth. Therefore, the pilot density preconfigured for the first frequency domain unit may be replaced with the pilot density preconfigured for the reporting bandwidth, or the preconfigured pilot density.

Optionally, operation 705 specifically includes: when the preconfigured pilot density is greater than or equal to 1, dividing the first frequency domain unit into a plurality of fourth frequency domain units.

In other words, when the preconfigured pilot density is less than 1, the first frequency domain unit is not divided.

For another example, the preset condition is that a quantity of RBs included in the first frequency domain unit is a multiple of 4.

Optionally, operation 705 specifically includes: when the quantity of RBs included in the first frequency domain unit is a multiple of 4, dividing the first frequency domain unit into a plurality of fourth frequency domain units.

The foregoing method 600 has described in detail a specific reason why the preconfigured pilot density can remain unchanged, regardless of whether the pilot density is less than 1, when the quantity of RBs included in the first frequency domain unit is a multiple of 4. For brevity, details are not described herein again.

In other words, when the pilot density is less than 1, if the quantity of RBs included in the first frequency domain unit is not a multiple of 4, the first frequency domain unit is not divided.

For another example, the preset condition is that a quantity of RBs included in the first frequency domain unit is an odd number.

Optionally, operation 705 specifically includes: when the quantity of RBs included in the first frequency domain unit is an odd number, dividing the first frequency domain unit into a plurality of fourth frequency domain units.

The foregoing method 600 has described in detail a specific reason why the preconfigured pilot density can remain unchanged, regardless of whether the pilot density is less than 1, when the quantity of RBs included in the first frequency domain unit is an odd number. For brevity, details are not described herein again.

In other words, when the pilot density is less than 1, if the quantity of RBs included in the first frequency domain unit is an even number, the first frequency domain unit is not divided.

Further, the foregoing preset conditions may be used in combination. For example, when the pilot density is less than 1 and the quantity of RBs included in the first frequency domain unit is an even number, but is not a multiple of 4, the first frequency domain unit is not divided.

For another example, when division is performed based on the predetermined second granularity, the preset condition is that a quantity of RBs included in the first frequency domain unit is an even number.

Optionally, operation 705 specifically includes: when the quantity of RBs included in the first frequency domain unit is an even number, dividing the first frequency domain unit into a plurality of fourth frequency domain units based on the predetermined second granularity, where the second granularity is determined based on the preconfigured first granularity and a ratio R of the first granularity to the second granularity. The foregoing method 600 has described in detail a specific reason why the preconfigured pilot density can remain unchanged, regardless of whether the pilot density is less than 1, when the quantity of RBs included in the first frequency domain unit is an even number. For brevity, details are not described herein again.

Because each preset condition is described in detail in the foregoing method 600, for brevity, details are not described herein again.

It should be understood that the preset conditions listed above are merely examples, and shall not constitute any limitation on this application. It should be further understood that quantities of RBs included in the first granularity and the second granularity and a specific value of the ratio R of the first granularity to the second granularity that are listed above are merely examples for ease of understanding, and shall not constitute any limitation on this application. Quantities of RBs included in the first granularity and the second granularity and a specific value of the ratio R of the first granularity to the second granularity are not limited in this application.

It should be further understood that the preset conditions listed above may be alternatively used in combination, provided that no conflict exists. For example, the preset condition may be that the granularity of the first frequency domain unit is greater than the second granularity, the quantity of RBs included in the first frequency domain unit is a multiple of 4, and the pilot density is less than 1. For brevity, other examples are not listed herein.

Optionally, operation 705 specifically includes: The terminal device determines the plurality of second-type frequency domain units based on the second granularity and the one or more first frequency domain units.

Specifically, the terminal device may divide, based on the predetermined second granularity, the first frequency domain unit that meets the preset condition in the one or more first frequency domain units, into the plurality of second-type frequency domain units. A granularity of at least one of the plurality of second-type frequency domain units obtained through the division is the second granularity.

Optionally, the method further includes operation 706: The terminal device divides one or more second frequency domain units in the reporting bandwidth into a plurality of third frequency domain units.

Actually, the terminal device may perform operation 705 and operation 706 at the same time. In this embodiment, operation 705 and operation 706 are split into two operations merely for ease of distinguishment and description. A process in which the terminal device divides the first-type frequency domain unit in the reporting bandwidth is an internal implementation process of the terminal device. A specific operation process of operation 705 and operation 706 is not limited in this application.

A specific process in which the terminal device divides the second frequency domain unit into the plurality of third frequency domain units is described in detail in operation 430 in the foregoing method 400. For brevity, details are not described herein again.

Optionally, the method further includes operation 707: The terminal device receives second indication information, where the second indication information is used to indicate that the ratio R of the first granularity to the second granularity is not 1. Correspondingly, in operation 707, the network device sends the second indication information.

A specific method for indicating, by the network device, the ratio of the first granularity to the second granularity by using the second indication information is described in detail in the foregoing method 400. For brevity, details are not described herein again.

In operation 708, the terminal device sends a PMI, where the PMI is used to indicate a precoding matrix corresponding to each of the plurality of second-type frequency domain units. Correspondingly, in operation 708, the network device receives the PMI.

Specifically, the PMI may be used to indicate precoding matrices corresponding to each third frequency domain unit and each fourth frequency domain unit in the reporting bandwidth. It should be understood that a specific process in which the terminal device determines and sends the PMI is described in detail in operation 507 in the foregoing method 500. For brevity, details are not described herein again.

In operation 709, the network device determines, based on the PMI, the precoding matrix corresponding to each of the plurality of second-type frequency domain units.

After the network device receives the PMI, in operation 709, the network device may determine, based on the PMI, precoding matrices corresponding to each third frequency domain unit and each fourth frequency domain unit. In other words, the network device may determine, based on the PMI, the precoding matrix corresponding to each of the plurality of second-type frequency domain units.

Before determining the precoding matrix corresponding to each second-type frequency domain unit, the network device may first determine a granularity of each second-type frequency domain unit.

Therefore, the method 700 further includes the following operations:

Operation 710: The network device determines that the granularity of the first frequency domain unit is less than the preconfigured first granularity.

Operation 711: The network device divides the first frequency domain unit into one or more third frequency domain units and one second frequency domain unit.

Operation 712: The network device divides the second frequency domain unit into a plurality of third frequency domain units.

A specific process in which the network device performs operation 710 to operation 712 is similar to the foregoing specific process in which the terminal device performs operation 704 to operation 706. Therefore, for brevity, details are not described herein again.

The figure is merely an example in which operation 710 to operation 712 are shown between operation 708 and operation 709. However, this shall not constitute any limitation on this application. Operation 710 to operation 712 may be alternatively performed before operation 708 or may be performed before operation 702, provided that operation 710 to operation 712 are performed before operation 709.

After determining the granularity of each second-type frequency domain unit, the network device may determine, based on the PMI, the precoding matrix corresponding to each second-type frequency domain unit. A method for determining, by the network device based on the PMI, the precoding matrix corresponding to the second-type frequency domain unit corresponds to the foregoing method for performing channel measurement and reporting by the terminal device. A codebook type and a feedback manner on which reporting of the PMI is based may be pre-agreed by the network device and the terminal device, or may be predefined in a protocol. The terminal device and the network device may separately generate and decipher the PMI based on a same codebook type and a same feedback manner.

Therefore, in the method provided in the embodiments of this application, the first frequency domain unit at an edge of the reporting bandwidth is separately processed, and the first frequency domain unit that meets the preset condition may be divided into the plurality of second-type frequency domain units, to ensure that the pilot density is greater than or equal to the preconfigured pilot density, thereby helping obtain an accurate PMI feedback when the terminal device performs channel measurement on each second-type frequency domain unit. The network device may determine, based on the PMI feedback, the precoding matrix corresponding to each second-type frequency domain unit, to use the precoding matrix for data transmission. Therefore, this helps improve data transmission performance.

Figure 12:
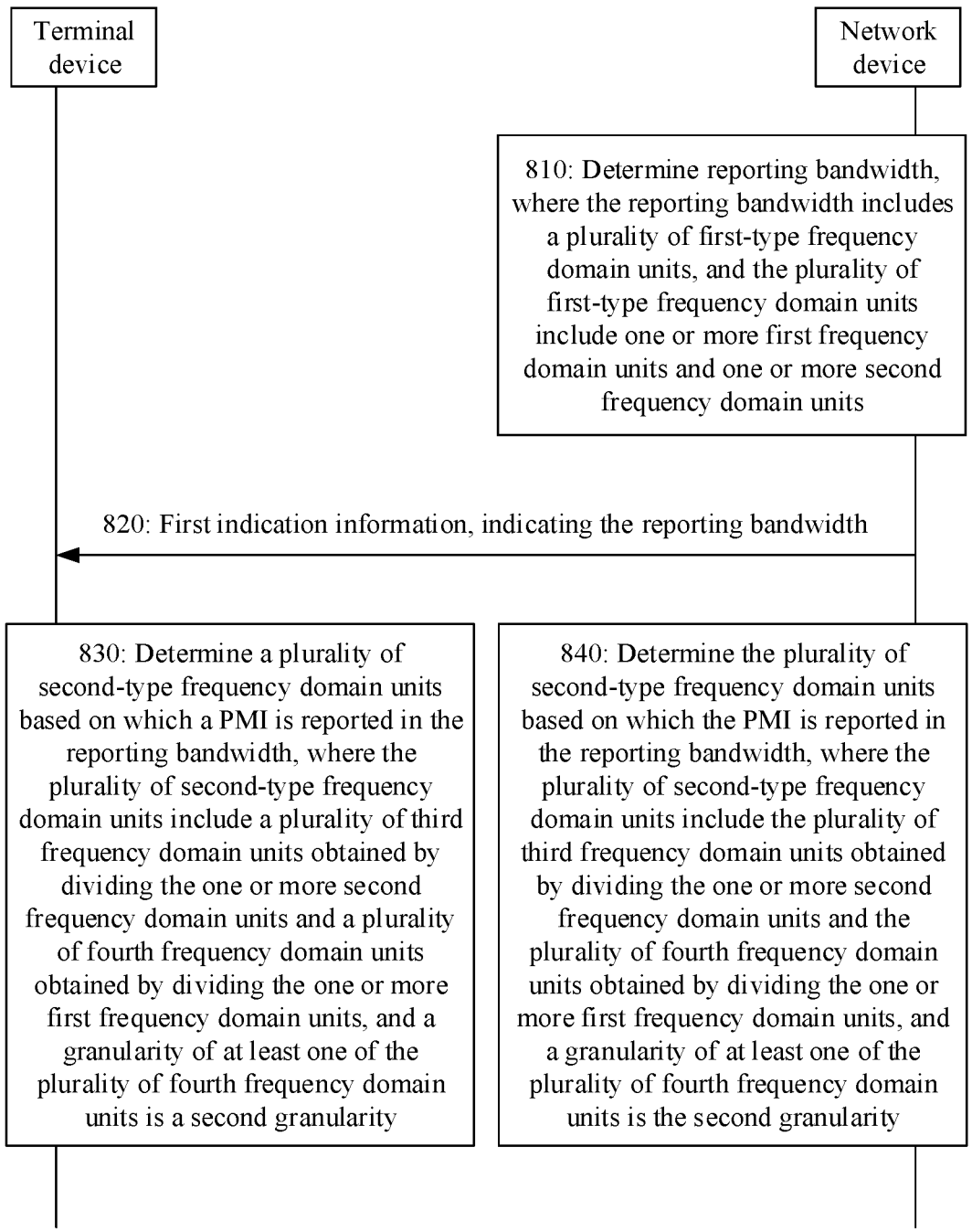
FIG. 12 is a schematic flowchart of a communication method according to yet another embodiment of this application.

FIG. 12 is a schematic flowchart of a communication method 800 according to still another embodiment of this application from a perspective of interaction between devices. As shown in the figure, the method 800 may include operation 810 to operation 840. The following describes the method 800 in detail with reference to the accompanying drawings.

In operation 810, a network device determines reporting bandwidth, where the reporting bandwidth includes a plurality of first-type frequency domain units on which reporting of a CQI is based.

Specifically, the plurality of first-type frequency domain units include one or more first frequency domain units and one or more second frequency domain units. A granularity of the first frequency domain unit may be less than a preconfigured first granularity, or may be equal to a preconfigured first granularity. A granularity of the second frequency domain unit is the first granularity. The first granularity is a frequency domain granularity preconfigured for reporting the CQI.

In operation 820, the network device sends first indication information, where the first indication information is used to indicate the reporting bandwidth. Correspondingly, the network device receives the first indication information.

For specific descriptions of operation 810 and operation 820, refer to operation 410 and operation 420 in the foregoing method 400. For brevity, details are not described herein again.

In operation 830, the terminal device determines a plurality of second-type frequency domain units on which reporting of a PMI is based in the reporting bandwidth, where the plurality of second-type frequency domain units include a plurality of third frequency domain units obtained by dividing the one or more second frequency domain units and a plurality of fourth frequency domain units determined from the one or more first frequency domain units, and a granularity of at least one of the plurality of fourth frequency domain units is a second granularity.

Correspondingly, in operation 840, the network device determines the plurality of second-type frequency domain units on which reporting of the PMI is based in the reporting bandwidth, where the plurality of second-type frequency domain units include the plurality of third frequency domain units obtained by dividing the one or more second frequency domain units and the plurality of fourth frequency domain units determined from the one or more first frequency domain units, and a granularity of at least one of the plurality of fourth frequency domain units is the second granularity. Specifically, the terminal device and the network device may divide at least one first frequency domain unit in the one or more first frequency domain units into the plurality of fourth frequency domain units based on the predetermined second granularity, and divide the one or more second frequency domain units into the plurality of third frequency domain units.

As described above, when the granularity of the first frequency domain unit is greater than the second granularity, the first frequency domain unit may be divided into a plurality of second-type frequency domain units. If the first frequency domain unit is divided based on the second granularity, a plurality of second-type frequency domain units obtained by dividing one first frequency domain unit may include at least one frequency domain unit whose granularity is the second granularity and at least one frequency domain unit whose granularity is less than the second granularity. In other words, at least some of the plurality of fourth frequency domain units are obtained by dividing at least one of the one or more first frequency domain units based on the predetermined second granularity.

A granularity of each first frequency domain unit in the reporting bandwidth is not necessarily greater than the second granularity. Therefore, the terminal device may determine, from the one or more first frequency domain units in the reporting bandwidth, a first frequency domain unit whose granularity is greater than the second granularity, and divide the first frequency domain unit based on the second granularity.

The second granularity is a frequency domain granularity predetermined for reporting the PMI, and may be determined based on the first granularity and a ratio R of the first granularity to the second granularity.

Optionally, the method further includes: The terminal device determines the second granularity.

If the first frequency domain unit needs to be divided based on the second granularity, the terminal device may predetermine the second granularity. The second granularity may be specifically determined based on the preconfigured first granularity and the ratio R of the first granularity to the second granularity.

In the foregoing method 600 and method 700, a specific method for dividing the first frequency domain unit into the plurality of second-type frequency domain units based on the second granularity and a specific method for determining the second granularity are described in detail. For brevity, details are not described herein again.

In addition, the terminal device and the network device may separately divide the first frequency domain unit when determining that the first frequency domain unit meets some preset conditions.

For example, the preset condition may be one of the following listed items:

a. A preconfigured pilot density is greater than or equal to 1.

b. A quantity of RBs included in the first frequency domain unit is a multiple of 4.

c. A quantity of RBs included in the first frequency domain unit is an odd number.

d. A quantity of RBs included in the first frequency domain unit is an even number.

Each preset condition is described in detail in the foregoing methods 600 and 700. For brevity, details are not described herein again.

After determining the second-type frequency domain units on which reporting of the PMI is based, the terminal device may perform channel measurement and PMI feedback based on a reference signal received on each second-type frequency domain unit. After determining the second-type frequency domain units on which reporting of the PMI is based, the network device may determine, based on the received PMI, a precoding matrix corresponding to each second-type frequency domain unit.

A process in which the terminal device reports the PMI and the network device determines the precoding matrix based on the PMI is described in the foregoing method 400. Therefore, for brevity, details are not described herein again.

Therefore, in the technical solution provided in the embodiments of this application, the first frequency domain unit at an edge of the reporting bandwidth is separately processed. Specifically, in the method provided in this embodiment of this application, the first frequency domain unit is divided into the plurality of second-type frequency domain units based on the predefined second granularity. Dividing the first frequency domain unit can reduce a frequency domain granularity for reporting the PMI, so that the terminal device can perform channel measurement on a frequency domain unit with a smaller granularity, thereby helping obtain an accurate PMI feedback. In addition, dividing the first frequency domain unit that meets the preset condition can ensure that a pilot density of the second-type frequency domain unit obtained through division is greater than or equal to the preconfigured pilot density. This helps obtain a more accurate PMI feedback from the terminal device. The network device may determine, based on the PMI feedback, the precoding matrix corresponding to each second-type frequency domain unit, to use the precoding matrix for data transmission. Therefore, this helps improve data transmission performance.

Figure 13:
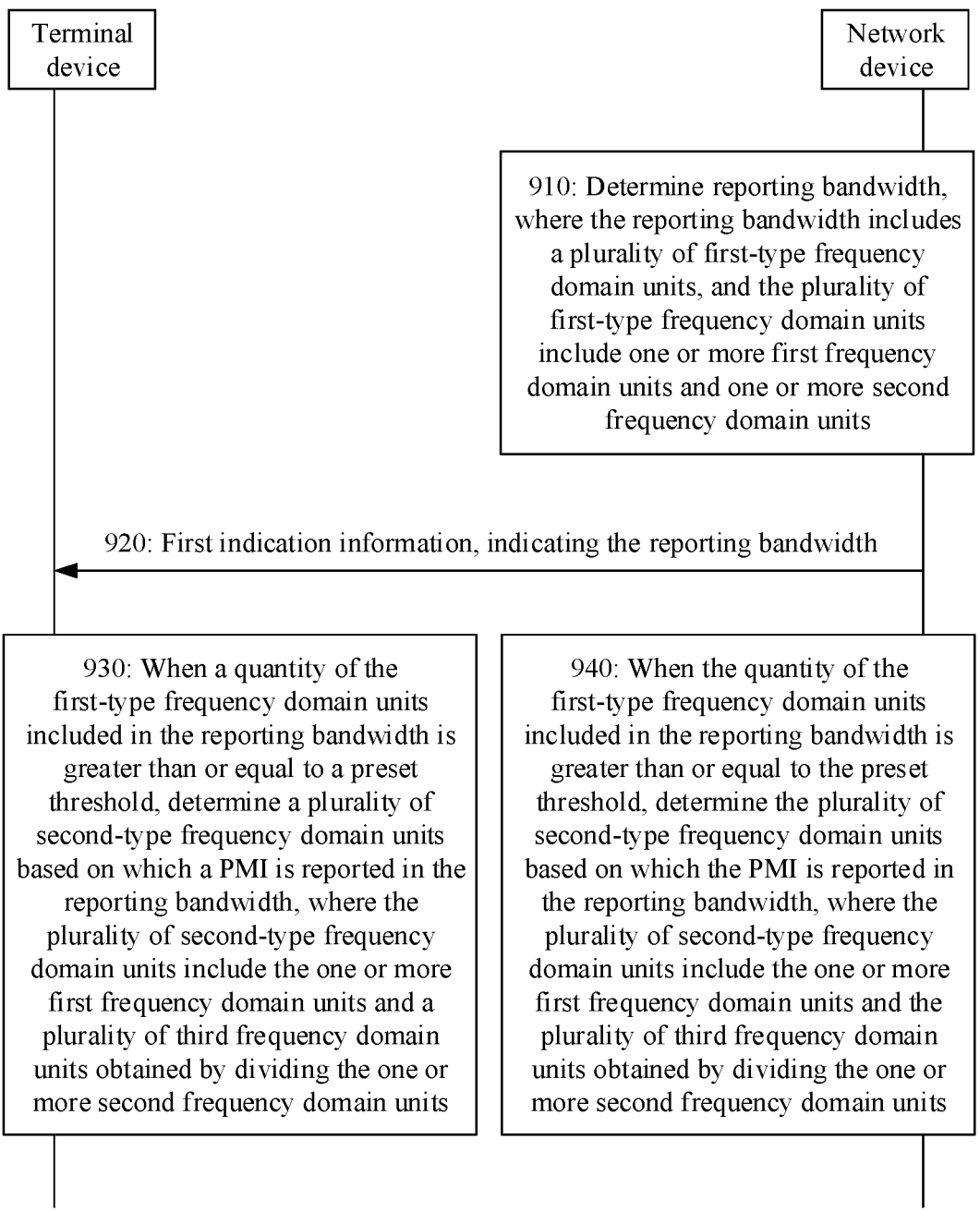
FIG. 13 is a schematic flowchart of a communication method according to yet another embodiment of this application.

FIG. 13 is a schematic flowchart of a communication method according to still another embodiment of this application from a perspective of interaction between devices. As shown in the figure, the method 900 includes operation 910 to operation 940. The following describes the method 900 in detail with reference to the accompanying drawings.

In operation 910, a network device determines reporting bandwidth, where the reporting bandwidth includes a plurality of first-type frequency domain units on which reporting of a CQI is based.

Specifically, the plurality of first-type frequency domain units include one or more first frequency domain units and one or more second frequency domain units. A granularity of the first frequency domain unit may be less than a preconfigured first granularity, or may be equal to a preconfigured first granularity. A granularity of the second frequency domain unit is a second granularity.

In operation 920, the network device sends first indication information, where the first indication information is used to indicate the reporting bandwidth. Correspondingly, the network device receives the first indication information.

For specific descriptions of operation 910 and operation 920, refer to operation 410 and operation 420 in the foregoing method 400. For brevity, details are not described herein again.

In operation 930, when a quantity of the first-type frequency domain units included in the reporting bandwidth is greater than or equal to a preset threshold, the terminal device determines a plurality of second-type frequency domain units on which reporting of a PMI is based in the reporting bandwidth, where the plurality of second-type frequency domain units include the one or more first frequency domain units and a plurality of third frequency domain units obtained by dividing the one or more second frequency domain units.

Correspondingly, in operation 940, when the quantity of the first-type frequency domain units included in the reporting bandwidth is greater than or equal to the preset threshold, the network device determines the plurality of second-type frequency domain units on which reporting of the PMI is based in the reporting bandwidth, where the plurality of second-type frequency domain units include the one or more first frequency domain units and the plurality of third frequency domain units obtained by dividing the one or more second frequency domain units.

In other words, when the quantity of the first-type frequency domain units included in the reporting bandwidth is greater than or equal to the preset threshold, the first frequency domain unit may not be divided. Each of the one or more first frequency domain units in the reporting bandwidth may be directly used as a fourth frequency domain unit. A granularity of each fourth frequency domain unit may be less than the second granularity, may be equal to the second granularity, or may be greater than the second granularity. Granularities of all fourth frequency domain units may be different from each other. The terminal device and the network device may divide only the one or more second frequency domain units in the reporting bandwidth, to obtain the plurality of third frequency domain units. A granularity of each third frequency domain unit is the second granularity.

Optionally, the preset threshold is a maximum value of the quantity of the first-type frequency domain units included in the reporting bandwidth.

In an embodiment, the preset threshold is 19. When the quantity of the first-type frequency domain units included in the reporting bandwidth is 19, the terminal device and the network device determine the plurality of second-type frequency domain units on which reporting of the PMI is based in the reporting bandwidth, where the plurality of second-type frequency domain units include the one or more first frequency domain units and the plurality of third frequency domain units obtained by dividing the one or more second frequency domain units.

In other words, a maximum quantity of the first-type frequency domain units included in the reporting bandwidth is 19. When the quantity of the first-type frequency domain units included in the reporting bandwidth is 19, each of two first frequency domain units (namely, the first and the last first-type frequency domain units in the reporting bandwidth) included in the 19 first-type frequency domain units may not be divided. The two first frequency domain units may be directly used as two fourth frequency domain units. The terminal device and the network device may divide 17 second frequency domain units in the 19 first-type frequency domain units to obtain 34 third frequency domain units. Therefore, 36 second-type frequency domain units can be obtained by dividing the 19 first-type frequency domain units.

The first-type frequency domain unit at an edge of the reporting bandwidth is not divided, so that a total quantity of the second-type frequency domain units can be reduced. In some codebook feedback manners, for example, a dual-domain compressed codebook feedback manner, the terminal device may report a selected frequency domain vector based on a channel measurement result. A length of the frequency domain vector is related to the total quantity of the second-type frequency domain units.

In a possible design, when a product of the quantity $N_{SB}$ of the first-type frequency domain units and a ratio R of the first granularity to the second granularity is less than or equal to 13, that is, when $N_{SB} \times R \leq 13$, a quantity of actually configured second-type frequency domain units is $N_3 = N_{SB} \times R$; when a product of the quantity $N_{SB}$ of the first-type frequency domain units and a ratio R of the first granularity to the second granularity is greater than 13, that is, when $N_{SB} \times R > 13$, a quantity $N_3$ of actually configured second-type frequency domain units is a product of powers of 2, 3, and 5. The terminal device may change a quantity of actually processed frequency domain dimensions to $2^\alpha 3^\beta 5^\gamma$ in a manner such as zero padding or pruning, where α, β, and γ are any integers greater than or equal to 0.

For example, when the total quantity $N_3$ of the second-type frequency domain units is 36, a frequency domain vector whose length is 36 may be selected. For another example, when the total quantity $N_3$ of the second-type frequency domain units is 38, a frequency domain vector whose length is 40 may be selected. In other words, a length of the frequency domain vector is greater than or equal to the total quantity of the second-type frequency domain units.

In other words, if the first frequency domain unit is divided, a value range of $N_3$ is {1, 2, 3, 4, 5, 6, 7, 8, 9, 10, 11, 12, 13, 15, 16, 18, 20, 24, 25, 27, 30, 32, 36, 40}; if the first frequency domain unit is not divided, a value range of $N_3$ is {1, 2, 3, 4, 5, 6, 7, 8, 9, 10, 11, 12, 13, 15, 16, 18, 20, 24, 25, 27, 30, 32, 36}.

In addition, the terminal device may prestore a codebook, to report the selected frequency domain vector based on the channel measurement result. It can be learned that, if the first frequency domain unit is not divided, the quantity of the second-type frequency domain units may be reduced, to help reduce the length of the frequency domain vector. When the quantity of the first-type frequency domain units reaches the preset threshold, a quantity of selectable values of the length of the frequency domain vector may be reduced, to reduce storage space occupied by the prestored codebook. The foregoing example is still used for description. When the quantity of the first-type frequency domain units included in the reporting bandwidth reaches the preset threshold, and the total quantity of the second-type frequency domain units obtained through division is 36, the terminal device does not need to additionally store a matrix whose dimension is 40*40. This can save storage space. This also saves storage space for the network device. For example, the network device may restore a precoding matrix of each second-type frequency domain unit based on a prestored codebook. Storing one less matrix can save a part of the storage space. In addition, because the first frequency domain unit is not divided, a pilot density of the first frequency domain unit does not change.

It should be understood that the preset threshold and the maximum quantity of the first-type frequency domain units included in the reporting bandwidth that are listed above are merely examples, and shall not constitute any limitation on this application. A specific value of the preset threshold and a specific value of the maximum quantity of the first-type frequency domain units that can be included in the reporting bandwidth are not limited in this application.

After determining the second-type frequency domain units on which reporting of the PMI is based, the terminal device may perform channel measurement and PMI feedback based on a reference signal received on each second-type frequency domain unit. After determining the second-type frequency domain units on which reporting of the PMI is based, the network device may determine, based on the received PMI, the precoding matrix corresponding to each second-type frequency domain unit.

A process in which the terminal device reports the PMI and the network device determines the precoding matrix based on the PMI is described in the foregoing method 400. Therefore, for brevity, details are not described herein again.

Therefore, in the technical solution provided in the embodiments of this application, the first frequency domain unit at the edge of the reporting bandwidth is separately processed. Specifically, in the method provided in this embodiment of this application, the first frequency domain unit at the edge of the reporting bandwidth is not divided, to ensure that a pilot density is greater than or equal to a preconfigured pilot density, thereby helping obtain an accurate PMI feedback when the terminal device performs channel measurement on each second-type frequency domain unit. The network device may determine, based on the PMI feedback, the precoding matrix corresponding to each second-type frequency domain unit, to use the precoding matrix for data transmission. Therefore, this helps improve data transmission performance. In addition, corresponding to some codebook feedback manners, storage space can be saved.

It should be understood that, in the foregoing embodiments, sequence numbers of the processes do not indicate execution sequences. Execution sequences of the processes should be determined based on functions and internal logic of the processes, and shall not constitute any limitation on an implementation process of the embodiments of this application.

The foregoing describes in detail the methods provided in the embodiments of this application, with reference to FIG. 5 to FIG. 13. The following describes in detail the apparatuses provided in the embodiments of this application, with reference to FIG. 14 to FIG. 16.

Figure 14:
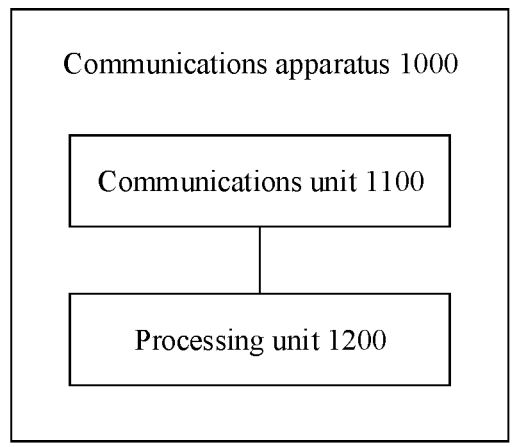
FIG. 14 is a schematic block diagram of a communications apparatus according to an embodiment of this application.

FIG. 14 is a schematic block diagram of a communications apparatus according to an embodiment of this application. As shown in FIG. 14, the communications apparatus 1000 may include a communications unit 1100 and a processing unit 1200.

In a possible design, the communications apparatus 1000 may correspond to the terminal device in the foregoing method embodiment, for example, may be the terminal device, or may be a chip configured in the terminal device. It should be understood that there may be one or more chips configured in the terminal device. This is not limited in this application. When a plurality of chips are configured in the terminal device, the plurality of chips may be configured to implement operations performed by the terminal device in the foregoing method embodiment.

Specifically, the communications apparatus 1000 may correspond to the terminal device in the method 400, the method 500, the method 600, the method 700, the method 800, or the method 900 according to the embodiments of this application. The communications apparatus 1000 may include units configured to perform the method performed by the terminal device in the method 400 in FIG. 5, the method 500 in FIG. 7A and FIG. 7B, the method 600 in FIG. 8, the method 700 in FIG. 11A and FIG. 11B, the method 800 in FIG. 12, or the method 900 in FIG. 13. In addition, the units in the communications apparatus 1000 and the foregoing other operations and/or functions are respectively used for implementing corresponding procedures of the method 400 in FIG. 5, the method 500 in FIG. 7A and FIG. 7B, the method 600 in FIG. 8, the method 700 in FIG. 11A and FIG. 11B, the method 800 in FIG. 12, or the method 900 in FIG. 13.

When the communications apparatus 1000 is configured to perform the method 400 in FIG. 5, the communications unit 1100 may be configured to perform operation 420 in the method 400, and the processing unit 1200 may be configured to perform operation 430 in the method 400. It should be understood that a specific process in which each unit performs the foregoing corresponding operation is described in detail in the foregoing method embodiment. For brevity, details are not described herein again.

When the communications apparatus 1000 is configured to perform the method 500 in FIG. 7A and FIG. 7B, the communications unit 1100 may be configured to perform operation 502, operation 506, and operation 570 in the method 500, and the processing unit 1200 may be configured to perform operation 503 to operation 505 in the method 500. It should be understood that a specific process in which each unit performs the foregoing corresponding operation is described in detail in the foregoing method embodiment. For brevity, details are not described herein again.

When the communications apparatus 1000 is configured to perform the method 600 in FIG. 8, the communications unit 1100 may be configured to perform operation 620 in the method 600, and the processing unit 1200 may be configured to perform operation 630 in the method 600. It should be understood that a specific process in which each unit performs the foregoing corresponding operation is described in detail in the foregoing method embodiment. For brevity, details are not described herein again.

When the communications apparatus 1000 is configured to perform the method 700 in FIG. 11A and FIG. 11B, the communications unit 1100 may be configured to perform operation 702, operation 707, and operation 708 in the method 700, and the processing unit 1200 may be configured to perform operation 703 to operation 706 in the method 700. It should be understood that a specific process in which each unit performs the foregoing corresponding operation is described in detail in the foregoing method embodiment. For brevity, details are not described herein again.

When the communications apparatus 1000 is configured to perform the method 800 in FIG. 12, the communications unit 1100 may be configured to perform operation 820 in the method 800, and the processing unit 1200 may be configured to perform operation 830 in the method 800. It should be understood that a specific process in which each unit performs the foregoing corresponding operation is described in detail in the foregoing method embodiment. For brevity, details are not described herein again.

When the communications apparatus 1000 is configured to perform the method 900 in FIG. 13, the communications unit 1100 may be configured to perform operation 920 in the method 900, and the processing unit 1200 may be configured to perform operation 930 in the method 900. It should be understood that a specific process in which each unit performs the foregoing corresponding operation is described in detail in the foregoing method embodiment. For brevity, details are not described herein again.

Figure 15:
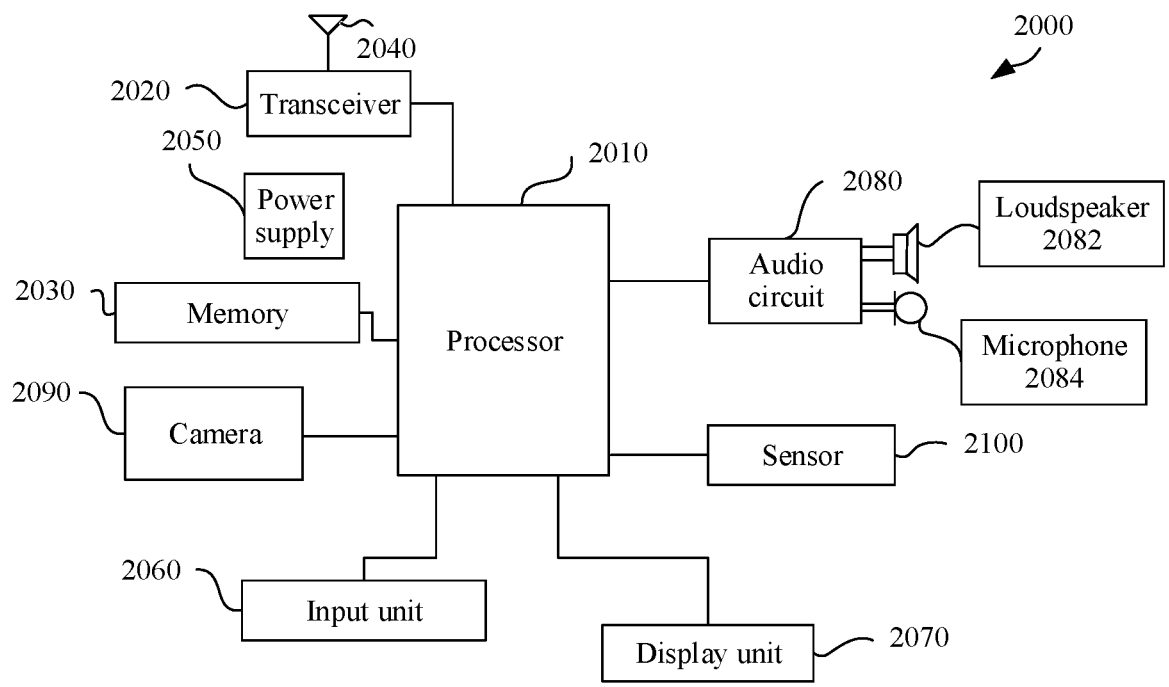
FIG. 15 is a schematic structural diagram of a terminal device according to an embodiment of this application.

It should be further understood that, when the communications apparatus 1000 is the terminal device, the communications unit 1100 in the communications apparatus 1000 may correspond to a transceiver 2020 in a terminal device 2000 shown in FIG. 15, and the processing unit 1200 in the communications apparatus 1000 may correspond to a processor 2010 in the terminal device 2000 shown in FIG. 15.

It should be further understood that, when the communications apparatus 1000 is the chip configured in the terminal device, the communications unit 1100 in the communications apparatus 1000 may be an input/output interface.

In another possible design, the communications apparatus 1000 may correspond to the network device in the foregoing method embodiment, for example, may be the network device, or may be a chip configured in the network device. It should be understood that there may be one or more chips configured in the network device. This is not limited in this application. When a plurality of chips are configured in the network device, the plurality of chips may be configured to implement operations performed by the network device in the foregoing method embodiment.

Specifically, the communications apparatus 1000 may correspond to the network device in the method 400, the method 500, the method 600, the method 700, the method 800, or the method 900 according to the embodiments of this application. The communications apparatus 1000 may include units configured to perform the method performed by the network device in the method 400 in FIG. 5, the method 500 in FIG. 7A and FIG. 7B, the method 600 in FIG. 8, the method 700 in FIG. 11A and FIG. 11B, the method 800 in FIG. 12, or the method 900 in FIG. 13. In addition, the units in the communications apparatus 1000 and the foregoing other operations and/or functions are respectively used for implementing corresponding procedures of the method 400 in FIG. 5, the method 500 in FIG. 7A and FIG. 7B, the method 600 in FIG. 8, the method 700 in FIG. 11A and FIG. 11B, the method 800 in FIG. 12, or the method 900 in FIG. 13.

When the communications apparatus 1000 is configured to perform the method 400 in FIG. 5, the communications unit 1100 may be configured to perform operation 420 in the method 400, and the processing unit 1200 may be configured to perform operation 410 and operation 440 in the method 400. It should be understood that a specific process in which each unit performs the foregoing corresponding operation is described in detail in the foregoing method embodiment. For brevity, details are not described herein again.

When the communications apparatus 1000 is configured to perform the method 500 in FIG. 7A and FIG. 7B, the communications unit 1100 may be configured to perform operation 502, operation 506, and operation 507 in the method 500, and the processing unit 1200 may be configured to perform operation 501 and operation 508 to operation 510 in the method 500. It should be understood that a specific process in which each unit performs the foregoing corresponding operation is described in detail in the foregoing method embodiment. For brevity, details are not described herein again.

When the communications apparatus 1000 is configured to perform the method 600 in FIG. 8, the communications unit 1100 may be configured to perform operation 620 in the method 600, and the processing unit 1200 may be configured to perform operation 610 and operation 640 in the method 600. It should be understood that a specific process in which each unit performs the foregoing corresponding operation is described in detail in the foregoing method embodiment. For brevity, details are not described herein again.

When the communications apparatus 1000 is configured to perform the method 700 in FIG. 11A and FIG. 11B, the communications unit 1100 may be configured to perform operation 702, operation 707, and operation 708 in the method 700, and the processing unit 1200 may be configured to perform operation 709 to operation 712 in the method 700. It should be understood that a specific process in which each unit performs the foregoing corresponding operation is described in detail in the foregoing method embodiment. For brevity, details are not described herein again.

When the communications apparatus 1000 is configured to perform the method 800 in FIG. 12, the communications unit 1100 may be configured to perform operation 820 in the method 800, and the processing unit 1200 may be configured to perform operation 810 and operation 840 in the method 800. It should be understood that a specific process in which each unit performs the foregoing corresponding operation is described in detail in the foregoing method embodiment. For brevity, details are not described herein again.

When the communications apparatus 1000 is configured to perform the method 900 in FIG. 13, the communications unit 1100 may be configured to perform operation 920 in the method 900, and the processing unit 1200 may be configured to perform operation 910 and operation 940 in the method 900. It should be understood that a specific process in which each unit performs the foregoing corresponding operation is described in detail in the foregoing method embodiment. For brevity, details are not described herein again.

Figure 16:
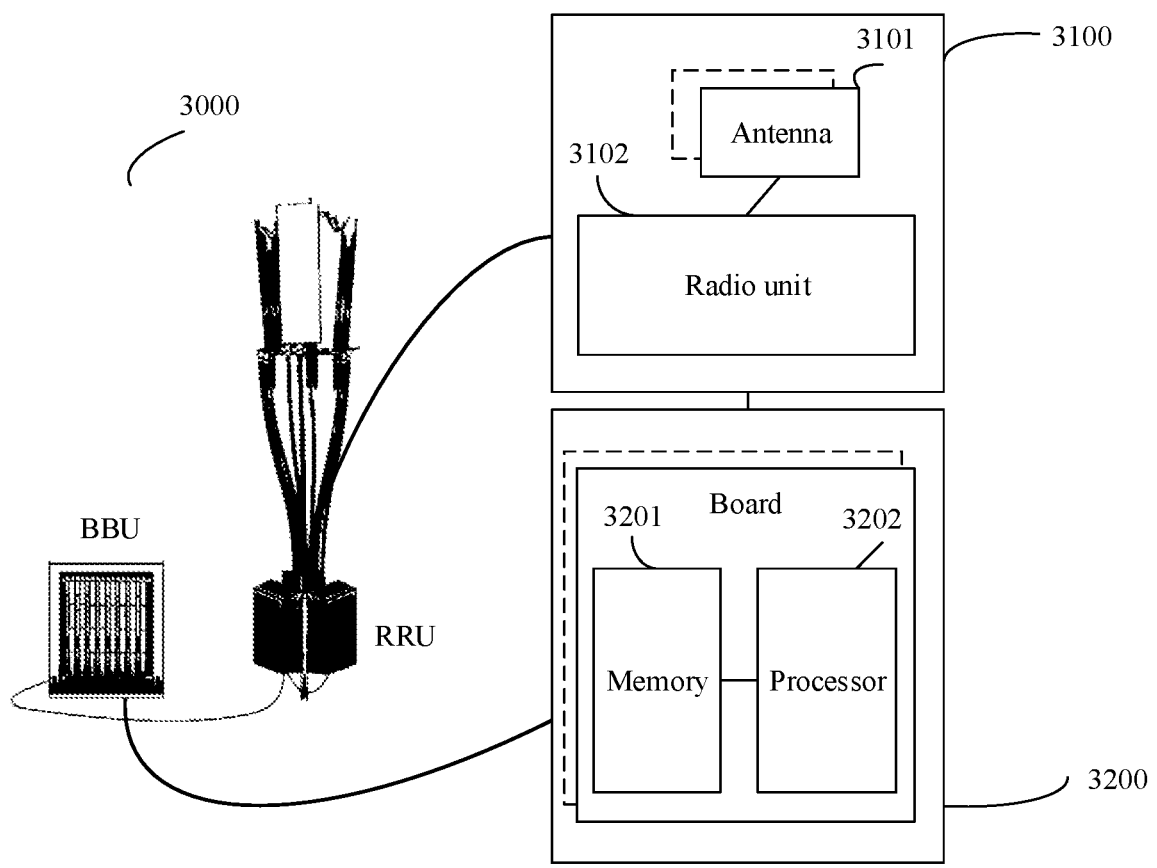
FIG. 16 is a schematic structural diagram of a network device according to an embodiment of this application.

It should be further understood that, when the communications apparatus 1000 is the network device, the communications unit 1100 in the communications apparatus 1000 may correspond to an RRU 3100 in abase station 3000 shown in FIG. 16, and the processing unit 1200 in the communications apparatus 1000 may correspond to a BBU 3200 in the base station 3000 shown in FIG. 16.

It should be further understood that, when the communications apparatus 1000 is the chip configured in the network device, the communications unit 1100 in the communications apparatus 1000 may be an input/output interface.

FIG. 15 is a schematic structural diagram of a terminal device 2000 according to an embodiment of this application. The terminal device 2000 may be applied to the system shown in FIG. 1, and performs functions of the terminal device in the foregoing method embodiment. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other by using an internal connection path, to transfer a control signal and/or a data signal. The memory 2030 is configured to store a computer program. The processor 2010 is configured to invoke the computer program from the memory 2030 and run the computer program, to control the transceiver 2020 to receive and send signals. Optionally, the terminal device 2000 may further include an antenna 2040, configured to send, by using a radio signal, uplink data or uplink control signaling that is output by the transceiver 2020.

The processor 2010 and the memory 2030 may be integrated into one processing apparatus, and the processor 2010 is configured to execute program code stored in the memory 2030, to implement the foregoing functions. During specific implementation, the memory 2030 may be alternatively integrated into the processor 2010, or may be independent of the processor 2010. The processor 2010 may correspond to the processing unit in FIG. 14.

The transceiver 2020 may correspond to the communications unit in FIG. 14, and may also be referred to as a transceiver unit. The transceiver 2020 may include a receiver (also referred to as a receiver or a receiver circuit) and a transmitter (also referred to as a transmitter or a transmitter circuit). The receiver is configured to receive a signal, and the transmitter is configured to transmit a signal.

It should be understood that the terminal device 2000 shown in FIG. 15 can implement each process related to the terminal device in the method embodiment shown in FIG. 5, FIG. 7A, FIG. 7B, FIG. 8, FIG. 11A, FIG. 11B, FIG. 12, or FIG. 13. Operations and/or functions of all modules in the terminal device 2000 are respectively used for implementing corresponding procedures in the foregoing method embodiment. For details, refer to the descriptions in the foregoing method embodiment. To avoid repetition, detailed descriptions are properly omitted herein.

The processor 2010 may be configured to perform an action that is described in the foregoing method embodiment and that is internally implemented by the terminal device. The transceiver 2020 may be configured to perform an action, described in the foregoing method embodiment, of sending by the terminal device to the network device or receiving by the terminal device from the network device. For details, refer to the descriptions in the foregoing method embodiment. Details are not described herein again.

Optionally, the terminal device 2000 may further include a power supply 2050, configured to supply power to various components or circuits in the terminal device.

In addition, to make functions of the terminal device more complete, the terminal device 2000 may further include one or more of an input unit 2060, a display unit 2070, an audio circuit 2080, a camera 2090, a sensor 2100, and the like. The audio circuit may further include a loudspeaker 2082, a microphone 2084, and the like.

FIG. 16 is a schematic structural diagram of a network device according to an embodiment of this application. For example, FIG. 16 may be a schematic structural diagram of a base station. The base station 3000 may be applied to the system shown in FIG. 1, and performs functions of the network device in the foregoing method embodiment. As shown in the figure, the base station 3000 may include one or more radio units, for example, a remote radio unit (RRU) 3100, and one or more baseband units (BBU) (which may also be referred to as a distributed unit (DU)) 3200. The RRU 3100 may be referred to as a transceiver unit, and corresponds to the communications unit 1100 in FIG. 14. Optionally, the RRU 3100 may also be referred to as a transceiver, a transceiver circuit, a transceiver, or the like, and may include at least one antenna 3101 and a radio unit 3102. Optionally, the RRU 3100 may include a receiving unit and a sending unit. The receiving unit may correspond to a receiver (also referred to as a receiver or a receiver circuit), and the sending unit may correspond to a transmitter (also referred to as a transmitter or a transmitter circuit). The RRU 3100 part is mainly configured to receive and send radio frequency signals and perform conversion between a radio frequency signal and a baseband signal, for example, is configured to send indication information to a terminal device. The BBU 3200 part is mainly configured to perform baseband processing, control the base station, and the like. The RRU 3100 and the BBU 3200 may be physically disposed together, or may be physically disposed separately, that is, disposed for a distributed base station.

The BBU 3200 is a control center of the base station, may also be referred to as a processing unit, may correspond to the processing unit 1200 in FIG. 14, and is mainly configured to complete baseband processing functions such as channel coding, multiplexing, modulation, and spread spectrum. For example, the BBU (the processing unit) may be configured to control the base station to perform an operation procedure related to the network device in the foregoing method embodiment, for example, generate the foregoing first indication information.

In an example, the BBU 3200 may include one or more boards. The plurality of boards may jointly support a radio access network of a single access standard (for example, an LTE network), or may separately support radio access networks of different access standards (for example, an LTE network and a 5G network). The BBU 3200 further includes a memory 3201 and a processor 3202. The memory 3201 is configured to store an instruction and data that are necessary. The processor 3202 is configured to control the base station to perform a necessary action, for example, configured to control the base station to perform an operation procedure related to the network device in the foregoing method embodiment. The memory 3201 and the processor 3202 may serve one or more boards. That is, a memory and a processor may be separately disposed on each board, or a plurality of boards may share a same memory and a same processor. In addition, a necessary circuit may be further disposed on each board.

It should be understood that the base station 3000 shown in FIG. 16 can implement each process related to the network device in the method embodiment shown in FIG. 5, FIG. 7A, FIG. 7B, FIG. 8, FIG. 11A, FIG. 11B, FIG. 12, or FIG. 13. Operations and/or functions of all modules in the base station 3000 are respectively used for implementing corresponding procedures in the foregoing method embodiment. For details, refer to the descriptions in the foregoing method embodiment. To avoid repetition, detailed descriptions are properly omitted herein.

The BBU 3200 may be configured to perform an action that is described in the foregoing method embodiment and that is internally implemented by the network device. The RRU 3100 may be configured to perform an action, described in the foregoing method embodiment, of sending by the network device to the terminal device or receiving by the network device from the terminal device. For details, refer to the descriptions in the foregoing method embodiment. Details are not described herein again.

It should be understood that the base station 3000 shown in FIG. 16 is merely a possible architecture of the network device, and shall not constitute any limitation on this application. The method provided in the embodiments of this application may be applicable to a network device with another architecture, for example, an active antenna unit (AAU) or a CU+DU. A specific architecture of the network device is not limited in this application.

An embodiment of this application further provides a processing apparatus, including a processor and an interface. The processor is configured to perform the method in any one of the foregoing method embodiments.

It should be understood that the foregoing processing apparatus may be one or more chips. For example, the processing apparatus may be a field programmable gate array (FPGA), may be an application-specific integrated chip (ASIC), may be a system on chip (SoC), may be a central processing unit (CPU), may be a network processor (network processor, NP), may be a digital signal processor (DSP), may be a micro controller (MCU), or may be a programmable controller (PLD) or another integrated chip.

In an implementation process, the operations of the foregoing methods may be completed by using an integrated logic circuit of hardware in the processor, or by using an instruction in a form of software. The operations of the methods disclosed with reference to the embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information in the memory, and completes the operations of the foregoing methods in combination with the hardware of the processor. To avoid repetition, details are not described herein again.

It should be noted that the processor in the embodiments of this application may be an integrated circuit chip and has a signal processing capability. In an implementation process, the operations in the foregoing method embodiments may be completed by using the integrated logic circuit of the hardware in the processor, or by using the instruction in the form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, operations, and logical block diagrams disclosed in the embodiments of this application. The general purpose processor may be a microprocessor, or the processor may be any conventional processor or the like. The operations of the methods disclosed with reference to the embodiments of this application may be directly performed and completed by a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information in the memory, and completes the operations of the foregoing methods in combination with the hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of illustration rather than limitation, RAMs in many forms may be used, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification is intended to include but is not limited to these memories and any other memory of a suitable type.

According to the method provided in the embodiments of this application, this application further provides a computer program product. The computer program product includes computer program code. When the computer program code is run on a computer, the computer is enabled to perform the method in the embodiment shown in FIG. 5, FIG. 7A, FIG. 7B, FIG. 8, FIG. 11A, FIG. 11B, FIG. 12, or FIG. 13.

According to the method provided in the embodiments of this application, this application further provides a computer readable medium. The computer readable medium stores program code. When the program code is run on a computer, the computer is enabled to perform the method in the embodiment shown in FIG. 5, FIG. 7A, FIG. 7B, FIG. 8, FIG. 11A, FIG. 11B, FIG. 12, or FIG. 13.

According to the method provided in the embodiments of this application, this application further provides a system, including one or more terminal devices described above and one or more network devices described above.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer instruction is loaded and executed on a computer, the procedures or functions according to the embodiments of this application are all or partially generated. The computer may be a general-purpose computer, a special-purpose computer, a computer network, or another programmable apparatus. The computer instruction may be stored in a computer readable storage medium, or may be transmitted from one computer readable storage medium to another computer readable storage medium. For example, the computer instruction may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The network device and the terminal device in the foregoing apparatus embodiments completely correspond to the network device and the terminal device in the method embodiments, and corresponding modules or units perform corresponding operations. For example, the communications unit (transceiver) performs a receiving or sending operation in the method embodiments, and the processing unit (processor) may perform an operation other than sending and receiving. For functions of specific units, refer to corresponding method embodiments. There may be one or more processors.

Terms such as "component", "module", and "system" used in this specification are used to represent computer-related entities, hardware, firmware, combinations of hardware and software, software, or software being executed. For example, a component may be but is not limited to a process that is run on a processor, a processor, an object, an executable file, an execution thread, a program, and/or a computer. As shown in the figure, both an application that is run on a computing device and the computing device may be components. One or more components may reside in a process and/or an execution thread, and the components may be located on one computer and/or distributed on two or more computers. In addition, these components may be executed from various computer readable media that store various data structures. For example, the components may communicate by using a local process and/or a remote process and based on a signal having one or more data packets (for example, data from two components interacting with another component in a local system, a distributed system, and/or a network, for example, the Internet interacting with another system by using a signal).

A person of ordinary skill in the art may be aware that various illustrative logical blocks and operations (operation) described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division, and may be other division during actual implementation. For example, a plurality of units or components may be combined, or may be integrated into another system, or some features may be ignored, or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate components may or may not be physically separate, and components displayed as units may or may not be physical units, may be located in one position, or may be distributed on a plurality of network units. Some or all of the units may be selected based on an actual requirement, to achieve the objectives of the solutions in the embodiments.

In addition, functional units in the embodiments of this application may be integrated into one processing unit, or each of the units may exist alone physically, or two or more units may be integrated into one unit.

In the foregoing embodiments, all or some of functions of the functional units may be implemented by using software, hardware, firmware, or any combination thereof. When software is used for implementation, all or some of the embodiments may be implemented in a form of a computer program product. The computer program product includes one or more computer instructions (programs). When the computer program instruction (program) is loaded and executed on a computer, the procedures or functions according to the embodiments of this application are all or partially generated. The computer may be a general-purpose computer, a special-purpose computer, a computer network, or another programmable apparatus. The computer instruction may be stored in a computer readable storage medium, or may be transmitted from one computer readable storage medium to another computer readable storage medium. For example, the computer instruction may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the function is implemented in a form of a software function unit and is sold or used as an independent product, the function may be stored in a computer readable storage medium. Based on such an understanding, the technical solutions in the embodiments of this application essentially, or the part contributing to the current technology, or some of the technical solutions may be implemented in a form of a software product. The computer software product is stored in a storage medium, and includes one or more instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    receiving first indication information, wherein the first indication information configures reporting bandwidth, the reporting bandwidth comprises a plurality of first-type frequency domain units on which reporting of a channel quality indicator (CQI) is based, the plurality of first-type frequency domain units comprise one or more first frequency domain units and one or more second frequency domain units, a granularity of a first frequency domain unit of the one or more first frequency domain units is less than a preconfigured first granularity, a granularity of a second frequency domain unit of the one or more second frequency domain units is the first granularity, and the first granularity is a frequency domain granularity preconfigured for reporting the CQI;
    when the granularity of the first frequency domain unit is less than or equal to a predetermined second granularity, determining a plurality of second-type frequency domain units on which reporting of a precoding matrix indicator (PMI) is based in the reporting bandwidth, wherein the plurality of second-type frequency domain units comprise the one or more first frequency domain units and a plurality of third frequency domain units obtained by dividing the one or more second frequency domain units, a granularity of a third frequency domain unit of the plurality of third frequency domain units is the second granularity, the second granularity is a frequency domain granularity predetermined for reporting the PMI, and the second granularity is less than the first granularity; and
    when the granularity of the first frequency domain unit is greater than a predetermined second granularity, determining a plurality of second-type frequency domain units on which reporting of a precoding matrix indicator (PMI) is based in the reporting bandwidth, wherein the plurality of second-type frequency domain units comprise a plurality of third frequency domain units obtained by dividing the one or more second frequency domain units and a plurality of fourth frequency domain units determined from the one or more first frequency domain units, at least some of the plurality of fourth frequency domain units are obtained by dividing the first frequency domain unit, a granularity of a third frequency domain unit of the plurality of third frequency domain units is the second granularity, a granularity of at least one of the plurality of fourth frequency domain units is less than the second granularity, the second granularity is a frequency domain granularity predetermined for reporting the PMI, and the second granularity is less than the first granularity.

2. The method according to claim 1, wherein the at least some of the plurality of fourth frequency domain units are obtained by dividing the first frequency domain unit based on the second granularity.

3. The method according to claim 1, wherein a quantity $N_2$ of resource blocks (RBs) comprised in the second granularity is equal to $N_1/R$, $N_1$ represents a quantity of RBs comprised in the first granularity, R is a ratio of the first granularity to the second granularity, and all of R, $N_1$, and $N_2$ are positive integers.

4. The method according to claim 3, wherein the method further comprises:
    receiving second indication information, wherein the second indication information indicates that the ratio R of the first granularity to the second granularity is not 1.

5. The method according to claim 4, wherein the receiving the second indication information comprises:
    receiving the second indication information by using radio resource control (RRC) signaling.

6. The method according to claim 1, wherein the receiving the first indication information comprises:
    receiving the first indication information by using radio resource control (RRC) signaling.

7. A communications apparatus, comprising:
at least one processor configured with processor-executable instructions to perform operations comprising:
receiving first indication information, wherein the first indication information configures reporting bandwidth, the reporting bandwidth comprises a plurality of first-type frequency domain units on which reporting of a channel quality indicator (CQI) is based, the plurality of first-type frequency domain units comprise one or more first frequency domain units and one or more second frequency domain units, a granularity of a first frequency domain unit of the one or more first frequency domain units is less than a preconfigured first granularity, a granularity of a second frequency domain unit of the one or more second frequency domain units is the first granularity, and the first granularity is a frequency domain granularity preconfigured for reporting the CQI;
when the granularity of the first frequency domain unit is less than or equal to a predetermined second granularity, determining a plurality of second-type frequency domain units on which reporting of a precoding matrix indicator (PMI) is based in the reporting bandwidth, wherein the plurality of second-type frequency domain units comprise the one or more first frequency domain units and a plurality of third frequency domain units obtained by dividing the one or more second frequency domain units, a granularity of a third frequency domain unit of the plurality of third frequency domain units is the second granularity, the second granularity is a frequency domain granularity predetermined for reporting the PMI, and the second granularity is less than the first granularity; and
when the granularity of the first frequency domain unit is greater than a predetermined second granularity, determining a plurality of second-type frequency domain units on which reporting of a precoding matrix indicator (PMI) is based in the reporting bandwidth, wherein the plurality of second-type frequency domain units comprise a plurality of third frequency domain units obtained by dividing the one or more second frequency domain units and a plurality of fourth frequency domain units determined from the one or more first frequency domain units, at least some of the plurality of fourth frequency domain units are obtained by dividing the first frequency domain unit, a granularity of a third frequency domain unit of the plurality of third frequency domain units is the second granularity, a granularity of at least one of the plurality of fourth frequency domain units is less than the second granularity, the second granularity is a frequency domain granularity predetermined for reporting the PMI, and the second granularity is less than the first granularity.

8. The communications apparatus according to claim 7, wherein the at least some of the plurality of fourth frequency domain units are obtained by dividing the first frequency domain unit based on the second granularity.

9. The communications apparatus according to claim 7, wherein a quantity $N_2$ of resource blocks (RBs) comprised in the second granularity is equal to $N_1/R$, $N_1$ represents a quantity of RBs comprised in the first granularity, R is a ratio of the first granularity to the second granularity, and all of R, $N_1$, and $N_2$ are positive integers.

10. The communications apparatus according to claim 9, wherein the processor-executable instructions are for execution by the at least one processor to receive second indication information, and wherein the second indication information indicates that the ratio R of the first granularity to the second granularity is not 1.

11. The communications apparatus according to claim 10, wherein the processor-executable instructions are for execution by the at least one processor to receive the second indication information by using radio resource control (RRC) signaling.

12. The communications apparatus according to claim 7, wherein the processor-executable instructions are for execution by the at least one processor to receive the first indication information by using radio resource control (RRC) signaling.

13. The communications apparatus according to claim 7, wherein the communications apparatus is a chip.

14. A non-transitory computer-readable storage medium storing computer instructions, that when executed by at least one processor, cause the at least one processor to perform operations comprising:
receiving first indication information, wherein the first indication information configures reporting bandwidth, the reporting bandwidth comprises a plurality of first-type frequency domain units on which reporting of a channel quality indicator (CQI) is based, the plurality of first-type frequency domain units comprise one or more first frequency domain units and one or more second frequency domain units, a granularity of a first frequency domain unit of the one or more first frequency domain units is less than a preconfigured first granularity, a granularity of a second frequency domain unit of the one or more second frequency domain units is the first granularity, and the first granularity is a frequency domain granularity preconfigured for reporting the CQI;
when the granularity of the first frequency domain unit is less than or equal to a predetermined second granularity, determining a plurality of second-type frequency domain units on which reporting of a precoding matrix indicator (PMI) is based in the reporting bandwidth, wherein the plurality of second-type frequency domain units comprise the one or more first frequency domain units and a plurality of third frequency domain units obtained by dividing the one or more second frequency domain units, a granularity of a third frequency domain unit of the plurality of third frequency domain units is the second granularity, the second granularity is a frequency domain granularity predetermined for reporting the PMI, and the second granularity is less than the first granularity; and
when the granularity of the first frequency domain unit is greater than a predetermined second granularity, determining a plurality of second-type frequency domain units on which reporting of a precoding matrix indicator (PMI) is based in the reporting bandwidth, wherein the plurality of second-type frequency domain units comprise a plurality of third frequency domain units obtained by dividing the one or more second frequency domain units and a plurality of fourth frequency domain units determined from the one or more first frequency domain units, at least some of the plurality of fourth frequency domain units are obtained by dividing the first frequency domain unit, a granularity of a third frequency domain unit of the plurality of third frequency domain units is the second granularity, a granularity of at least one of the plurality of fourth frequency domain units is less than the second granularity, the second granularity is a frequency domain granularity predetermined for reporting the PMI, and the second granularity is less than the first granularity.

15. The non-transitory computer-readable storage medium according to claim 14, wherein the at least some of the plurality of fourth frequency domain units are obtained by dividing the first frequency domain unit based on the second granularity.

16. The non-transitory computer-readable storage medium according to claim 14, wherein a quantity $N_2$ of resource blocks (RBs) comprised in the second granularity is equal to $N_1/R$, $N_1$ represents a quantity of RBs comprised in the first granularity, R is a ratio of the first granularity to the second granularity, and all of R, $N_1$, and $N_2$ are positive integers.

17. The non-transitory computer-readable storage medium according to claim 16, wherein the computer instructions when executed by the at least one processor, cause the at least one processor to perform operations comprising:
receiving second indication information, wherein the second indication information indicates that the ratio R of the first granularity to the second granularity is not 1.

18. The non-transitory computer-readable storage medium according to claim 17, wherein
the computer instructions when executed by the at least one processor, cause the at least one processor to receive the second indication information by using radio resource control (RRC) signaling.

19. The non-transitory computer-readable storage medium according to claim 14, wherein
the computer instructions when executed by the at least one processor, cause the at least one processor to receive the first indication information by using radio resource control (RRC) signaling.

* * * * *